United States Patent
Karabatis et al.

(10) Patent No.: US 11,620,389 B2
(45) Date of Patent: Apr. 4, 2023

(54) METHOD AND SYSTEM FOR REDUCING FALSE POSITIVES IN STATIC SOURCE CODE ANALYSIS REPORTS USING MACHINE LEARNING AND CLASSIFICATION TECHNIQUES

(71) Applicant: University of Maryland Baltimore County, Baltimore, MD (US)

(72) Inventors: George Karabatis, Ellicott City, MD (US); Foteini Cheirdari-Argiropoulos, Fallston, MD (US)

(73) Assignee: UNIVERSITY OF MARYLAND BALTIMORE COUNTY, Baltimore, MD (US)

( * ) Notice: Subject to any disclaimer, the term of this patent is extended or adjusted under 35 U.S.C. 154(b) by 216 days.

(21) Appl. No.: 16/911,373

(22) Filed: Jun. 24, 2020

(65) Prior Publication Data
US 2020/0401702 A1    Dec. 24, 2020

Related U.S. Application Data

(60) Provisional application No. 62/865,505, filed on Jun. 24, 2019.

(51) Int. Cl.
G06F 21/57    (2013.01)
G06F 8/75    (2018.01)
G06K 9/62    (2022.01)
G06N 20/00    (2019.01)

(52) U.S. Cl.
CPC ......... G06F 21/577 (2013.01); G06K 9/6267 (2013.01); G06N 20/00 (2019.01)

(58) Field of Classification Search
CPC ..... G06F 21/577; G06N 20/00; G06K 9/6267
See application file for complete search history.

(56) References Cited

U.S. PATENT DOCUMENTS

| | | |
|---|---|---|
| 6,711,474 B1 | 3/2004 | Treyz et al. |
| 6,775,792 B2 | 8/2004 | Ulrich et al. |
| 7,401,152 B2 | 7/2008 | Traversat et al. |
| 7,552,467 B2 | 6/2009 | Lindsay |
| 7,685,083 B2 | 3/2010 | Fairweather |
| 7,702,624 B2 | 4/2010 | King et al. |
| 7,805,377 B2 | 9/2010 | Felsher |
| 7,813,822 B1 | 10/2010 | Hoffberg |
| 7,823,055 B2 | 10/2010 | Sull et al. |

(Continued)

FOREIGN PATENT DOCUMENTS

EP    3467725 A1 *  4/2019    ............. G06F 11/36

*Primary Examiner* — Darshan I Dhruv
(74) *Attorney, Agent, or Firm* — Todd L. Juneau; Juneau & Mitchell

(57) ABSTRACT

This invention is a computer-implemented method and system of using a secondary classification algorithm after using a primary source code vulnerability scanning tool to more accurately label true and false vulnerabilities in source code. The method and system use machine learning within a 10% dataset to develop a classifier model algorithm. A selection process identifies the most important features utilized in the algorithm to detect and distinguish the true and false positive findings of the static code analysis results. A personal identifier is used as a critical feature for the classification. The model is validated by experimentation and comparison against thirteen existing classifiers.

5 Claims, 18 Drawing Sheets

(56) References Cited

U.S. PATENT DOCUMENTS

| | | |
|---|---|---|
| 7,953,760 B2 | 5/2011 | Coker et al. |
| 8,117,314 B2 | 2/2012 | Croft et al. |
| 8,181,167 B2 | 5/2012 | Zhao |
| 8,185,219 B2 | 5/2012 | Gilbert et al. |
| 8,185,548 B2 | 5/2012 | Lim |
| 8,316,237 B1 | 11/2012 | Felsher et al. |
| 8,347,272 B2 | 1/2013 | Sugawara et al. |
| 8,374,825 B2 | 2/2013 | Vock et al. |
| 8,468,244 B2 | 6/2013 | Redlich et al. |
| 8,482,993 B2 | 7/2013 | Strasser et al. |
| 8,522,217 B2 | 8/2013 | Dutta et al. |
| 8,566,115 B2 | 10/2013 | Moore |
| 8,578,076 B2 | 11/2013 | van der Linden et al. |
| 8,578,348 B2 | 11/2013 | Fliess et al. |
| 8,726,254 B2 | 5/2014 | Rohde et al. |
| 8,887,286 B2 | 11/2014 | Dupont et al. |
| 8,918,730 B2 | 12/2014 | von Kaenel et al. |
| 9,105,051 B2 | 8/2015 | Ricci |
| 9,107,586 B2 | 8/2015 | Tran |
| 9,117,447 B2 | 8/2015 | Gruber et al. |
| 9,118,713 B2 | 8/2015 | Bisht et al. |
| 9,143,529 B2 | 9/2015 | Qureshi et al. |
| 9,143,839 B2 | 9/2015 | Reisman |
| 9,164,546 B2 | 10/2015 | Sirpal et al. |
| 9,191,380 B2 | 11/2015 | Anderson et al. |
| 9,225,782 B2 | 12/2015 | Addepalli et al. |
| 9,230,099 B1 | 1/2016 | McCorkendale et al. |
| 9,268,949 B2 | 2/2016 | Kulakowski et al. |
| 9,329,689 B2 | 5/2016 | Osterhout et al. |
| 9,351,640 B2 | 5/2016 | Tran |
| 9,578,088 B2 | 2/2017 | Nickolov et al. |
| 9,684,795 B2 | 6/2017 | Lim |
| 9,798,884 B1 * | 10/2017 | Bishop, III ............ G06F 21/566 |
| 9,916,224 B2 | 3/2018 | Macleod et al. |
| 9,928,040 B2 | 3/2018 | Tarlow et al. |
| 10,002,337 B2 | 6/2018 | Siddique et al. |
| 10,031,969 B2 | 7/2018 | Maharajh et al. |
| 10,116,670 B2 | 10/2018 | Muddu et al. |
| 10,673,645 B2 | 6/2020 | Ansari et al. |
| 10,698,742 B2 | 6/2020 | Barsness et al. |
| 10,762,206 B2 | 9/2020 | Titonis et al. |
| 10,769,633 B2 | 9/2020 | Dua |
| 10,817,604 B1 * | 10/2020 | Kimball .................... G06F 8/73 |
| 2016/0182558 A1 * | 6/2016 | Tripp .................... G06F 21/562 726/25 |
| 2018/0157845 A1 * | 6/2018 | Mehta ................... G06F 21/577 |
| 2018/0373986 A1 * | 12/2018 | Rainwater .............. G06N 3/084 |
| 2019/0138731 A1 * | 5/2019 | Tan ..................... G06F 11/3608 |
| 2019/0347424 A1 * | 11/2019 | Bezzi .................... G06F 21/577 |
| 2019/0377880 A1 * | 12/2019 | Kolychev ................ G06N 3/08 |
| 2020/0057857 A1 * | 2/2020 | Roytman ................ G06N 7/005 |
| 2020/0057858 A1 * | 2/2020 | Sharma ................. G06N 20/20 |
| 2020/0320202 A1 * | 10/2020 | Farkash ................. G06N 20/00 |
| 2020/0356675 A1 * | 11/2020 | Shakarian ............ G06K 9/6267 |

* cited by examiner

Process Flow of Software Code Examination

*Source Code Path through Compilation*

*Static Code Analysis Tool Types*

*False Positive Trends Process*

*Preparing datasets and comparing Algorithms*

Number and Percentage of FP vulnerabilities per Tool

*Process of executing and comparing SGD and SAPI*

*Case I classifier results with 70% training set*

Case I classifier results with 10% training set

Case 11 ROC curve

FIG. 16

*Table 1 SAPI classification algorithm 1 with personal identifier*

ALGORITHM 1
Input: Import all findings
Output: Label Findings as True or False Positive
"Read All Findings"

1. While Not EOF do
   "Go through each finding where feature Fi exists where i=1,...n,
   j=1,...n and g=1,...n."
2.   Initialize k=4, a=1
3.     Get Fi
4.     While Fi exists do
5.       *Calculate probabilities* $R(C_i), R(A_i), R(P_i), R(S_i)$
   "Check if the following combinations exist"
   "Calculate combination probabilities"
6.       begin
7.       switch 1 do
8.         case $C_iP_j$ *Exists* do
9.           calculate $R(C_iP_j)$, k=k+1
10.         end
11.         case $C_iA_j$ *Exists* do
12.           calculate $R(C_iA_j)$, k=k+1
13.         end
14.         case $C_iP_jA_g$ *Exists* do
15.           calculate $R(C_iP_jA_g)$, k=k+1, a=a+1
16.         end
17.         case $C_iA_jS_g$ *Exists* do
18.           calculate $R(C_iA_jS_g)$, k=k+1, a=a+1
19.         end
20.       end
21.       end

22. $SAPI(F_i) = ((R(C_i) + R(P_i) + R(S_i) + R(A_i) + R(C_iA_j) + R(C_iP_jA_g) + R(C_iA_jS_g))/k + R(C_iP_jA_g) + R(C_iA_jS_g))/a$

23.     If SAPI(Fi)>θ then
24.       finding = TP (vulnerability)
25.     else
26.       finding = FP (Nonexistent vulnerability)
27.     end
28.   end
29. end

FIG. 17 -
Tunable/Calibration Selector
0.0 <--> 1.0

*Table 2 Algorithm 2 Determining the threshold*

ALGORITHM 2

If OTP < OFP then

θ = OTP else

θ = OFP end

If result of SAPI classification algorithm for finding fi > θ then finding = TP (vulnerability)

else finding = FP (Nonexistent vulnerability)

end

METHOD AND SYSTEM FOR REDUCING FALSE POSITIVES IN STATIC SOURCE CODE ANALYSIS REPORTS USING MACHINE LEARNING AND CLASSIFICATION TECHNIQUES

BACKGROUND

Field of the Invention

The embodiments described herein relate generally to software analysis tools, and particularly to post-processing software analysis tools for detecting true and false vulnerabilities after a preliminary static code analysis has been performed.

Background

Software assurance analysts deal with thousands of potential vulnerabilities many of which are false positives during the process of static code analysis. Manual review of all such potential vulnerabilities is tedious, time consuming, and frequently impractical. There are many open-source and proprietary static code analysis tools available in the art. However, current static code analysis tools are limited in their ability to identify true and false positives. Accordingly, a need exists for a method of further removing true and false positive vulnerabilities from a source code data set (by analyzing a static code analysis report) to further eliminate true and false vulnerabilities in source code.

Summary

This invention presents a novel classification algorithm along with its variants in a method of further identifying and labeling true and false positive vulnerabilities from a static code analysis report to further eliminate true and false vulnerabilities in source code.

After a preliminary static code analysis is performed, a selection process is run on the preliminary true/false vulnerabilities report to identify the most important features utilized in the algorithm to detect and distinguish the true and false positive findings of the static code analysis results. These features are used to generate a classifier model that includes using a personal identifier as a critical feature for the classification. The approach has been validated by experimentation and comparison against thirteen existing classifiers. Extensive examples were conducted using multiple production code and open source code with the aid of a variety of static code analysis tools. The results show significant improvements in Accuracy, Precision, and Recall, outperforming all participating classifiers, leading to significant improvements in the security posture of a software system.

BRIEF DESCRIPTION OF THE FIGS

FIG. 16 is a SAPI classification algorithm with personal identifier, according to an embodiment.

FIG. 17 is a tunable/calibration selector algorithm for determining and adjusting the output threshold, on a scale of 0 to 1.

DETAILED DESCRIPTION OF THE INVENTION

Figure 1:
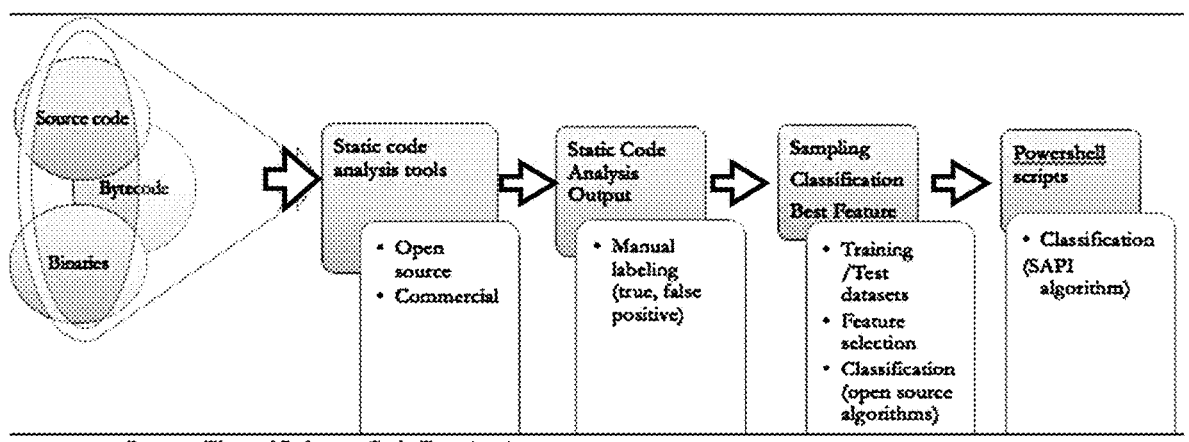
FIG. 1 is a graphical illustration of a process flow of software code examination, according to an embodiment.

A software vulnerability is a flaw of the source code or the design of a software system that may lead to security risks. For example, a vulnerability may be exploited by a malicious attacker to breach security and gain unauthorized access to information stored in a computing system.

The vulnerabilities that exist in the source code determine the security posture of the software system, which is defined as the level of risk associated with the possibility of a system being exploited, and subsequently compromising its confidentiality, integrity and availability. Confidentiality makes sure that only the right people have access to information, integrity is the assurance that data has not been altered and it is trustworthy, and availability is a guarantee that the information is available for people that have proper authorization to access it.

In this invention the words 'code base', 'source code' 'program' or 'system', refer to the source code of a software system which may be written in multiple programming languages. In order to discover possible vulnerabilities in the source code and prevent security breaches, several techniques have been utilized to identify such vulnerabilities. The two main techniques to identify vulnerabilities are static code analysis and dynamic code analysis.

The term "Static Code Analysis" (also known as Source Code Analysis) refers to a process that is usually performed as part of a Code Review (also known as white-box testing) and is carried out during the Implementation phase of a Security Development Lifecycle (SDL). Static Code Analysis is commonly conducted by executing Static Code Analysis tools that attempt to highlight possible vulnerabilities within 'static' (non-running) source code." Below is a list of common types of vulnerabilities that can be identified by static analysis: (1) Potential NULL pointer dereferences; (2) Access beyond an allocated area, otherwise known as a buffer overflow; (3) Writes to potentially read-only memory; (4) Reads of potentially uninitialized objects; (5) resource leaks (e.g., memory leaks and file descriptor leaks); (6) Use of memory that has already been deallocated; (7) Out-of-scope memory usage (e.g., returning the address of an automatic variable from a subroutine); (8) Failure to set a return value from a subroutine; and (9) Buffer and array underflows.

A static analyzer tool is a tool that analyzes source code or object code without executing the object code. A static analyzer tool may analyze code at one or more levels, such as the unit level and technology level. Unit level analysis involves analyzing a subroutine or certain code within a specific program, without connecting to the context of that program.

On the other hand, Dynamic code analysis is the technique of scanning the code for vulnerabilities while executing it, and identifies the following: (1) Resources consumed (time for program execution, memory size); (2) Cyclomatic complexity (number of paths inside the program), the degree of code coverage (degree code is executed) with tests, and other program metrics; (3) Similar vulnerabilities as static code analysis.

In addition, dynamic code analysis can identify security issues that may arise through the interaction with other system components like databases, application servers or Web Services.

Invention Problem

Static code analysis is necessary and should be used as part of the software development life cycle in addition to dynamic analysis. Static analysis can detect various types of vulnerabilities that a dynamic analysis may miss and offers a more holistic approach because it examines the entire source code, as opposed to dynamic analysis that only examines the part of the code that is being executed.

The invention provides a secondary method of identifying vulnerabilities after a static analyzer tool has performed a primary static code analysis. Static code analysis offers tremendous benefits for the overall security posture of the system because it detects a lot of vulnerabilities that a human may miss. There are many available open source and commercial tools that perform static code analysis. Some tools are able to scan source code written in different programming languages to identify vulnerabilities, while others are specialized in one programming language. A detail listing of the tools available can be found at https://en.wikipedia.org/wiki/List_of_tools_for_static_code_analysis, incorporated herein by reference. This list can include specific tools for C++ and Java.

C++ static analysis tools include: Astree, Axivion Bauhaus Suite, BLAST, Clang, CLion, Coccinelle, Coverity, CPAchecker, Cppcheck, Cppdepend, cpplint, ECLAIR, Eclipse, Fluctuat, Frama-C, Goanna, Helix QAC, Infer, Lint, LDRA testbed, Parasoft C/C++ test, PC-Lint, Polyspace, SLAM project, Sparse, SonarQube, Splint, and Visual Studio.

Java static analysis tools include: Checkstyle, Coverity, Eclipse, FindBugs, Infer, IntelliJ IDEA, JArchitect, Jtest, LDRA Testbed, PMD, RIPS, SemmieCode, Soot, SpotBugs, Squale, SourceMeter, and ThreadSafe.

Critical flaws (flaws that can cause significant harm and can be easily exploited) in the source code are first identified by the tools, subsequently they are remediated, thus improving the integrity, confidentiality and availability of the systems.

However, software assurance analysts and software developers usually deal with tens of thousands if not hundreds of thousands of potential vulnerabilities that have been identified during the process of static code analysis, many of which could be false positives (potential vulnerabilities identified by the static analysis tools which after human examination are deemed to be non-vulnerabilities).

Nevertheless, when a software system is processed by the static analysis tools, analysts must examine all potential vulnerabilities (manually) that have been identified in the scanned code by the tools, and verify whether they are actual vulnerabilities or false positives. In reality, limited personnel resources and time restrictions associated with software deadlines make the process of manually examining all vulnerabilities an impractical, very costly, and tedious task. Quite frequently it is typical for analysts to lose faith in the tools, distrust them, and cut corners by not examining all suggested vulnerabilities. This behavior potentially leads to lowering the security posture of the system with all serious and dangerous consequences. In other words, it is a serious problem that stems from the ambivalent classification of a potential vulnerability as true, or false.

Inventive Solution

In this invention, we explore the use of machine learning techniques applied during the static analysis process to generate a model ("classifier model") in order to eliminate or drastically reduce the high percentage of false positives.

Besides using machine learning for identifying false and true positives vulnerabilities we developed a new feature that we call Personal Identifier (PI) that is usually the author name, i.e. the name of the author of the source code that is generating one or more specific vulnerabilities. The National Institute of Standards & Technology (NIST) and The MITRE Corporation both maintain a list of bugs related to specific authors, which are assigned "vulnerability IDs".

We also assign unique weights to the each vulnerability feature for each dataset using the Information Gain feature selection method. In addition, we developed the usage of a smaller training dataset (10%) that makes the usage of machine learning a feasible approach in a production environment. Furthermore, when the PI feature is not available, we substitute it with file properties.

Each vulnerability is assigned a severity status by default from the static code analysis tools. The severity status identifies how easy it is to exploit the vulnerability and the damage that will cause to the system if it materializes. It is assigned based on each system's unique characteristics, as follows: The static analysis tools that scan the source code for potential vulnerabilities assign a preliminary severity status, however, based on our experience the severity status assigned by the tools is not always a reflection of the vulnerability exploitability or the damage that it can cause to the system.

One of the goals of the invention is to make the results generated from the static analysis tools easier to review, reduce the noise (false positives) and help focus on the results that are deemed more critical and important to address for each specific software system.

Contributions

Brief overview of the software vulnerability issues in software systems. The solutions that we provide result in the following contributions: (1) Identification and analysis of the most common false positive types of results for each static analysis tool used; (2) Identification of the relevant features to assist with classifier training and prediction of true and false vulnerabilities; (3) Comparison of open source classification algorithms for accuracy on predicting true and false positive vulnerabilities; (4) Use of only 10% of the input dataset for training, in order to provide an attainable, feasible, and practical solution for machine learning in Software Assurance (SwA) daily routine; (5) Creation and implementation of a novel classification algorithm to increase the prediction accuracy of vulnerabilities as either true or false positives; (6) Flexibility of the novel algorithm by substituting a feature (when not present) with other ones; (7) Extensive experimentation with different versions of the SAPI classification algorithm using several datasets and comparing it with 13 existing classifiers. The results show that in general SAPI outperforms all of them.

Most Common False Positive Types

In one aspect, the contribution of the first part of this invention is to identify the most common false positive types of vulnerabilities generated by the static analysis tools we have examined with a goal to possibly identify tool trends. There has not been extensive research on existing tools to measure the accuracy of the vulnerability predictions. In practice, there are a lot of false positive results in predicting vulnerabilities that each tool generates, and related research usually focuses on a few languages or/and tools. This contribution is a comprehensive and comparative study of several static code analysis tools evaluated on actual software systems written in different programming languages. We limit the scope of this contribution solely to false positives. The invention results can be used as a guideline for the developers and software assurance analysts when identifying vulnerabilities as true or false based on the tool being used and the type of vulnerability examined. It can also be used by the tool developers to examine the root cause that forces the tool to generate a false positive vulnerability, and allow them to improve the accuracy of their tool.

Most Relevant Features for Generating a Model

In another aspect, the second contribution is the identification of the most relevant set of features of each vulnerability that offer the greatest support in distinguishing and labeling accurately a vulnerability as false or true positive. We generated a heuristic approach for feature selection in combination with the Information Gain feature selection method, by conducting several examples with different vulnerability features in order to identify the set of features that help train the classifier and provide a more accurate classification of the vulnerabilities as true or false positive.

Comparison of 13 Classifers

In another aspect, the third contribution of our invention is a comparison of 13 classifiers and their performance on successfully predicting the true and false positive vulnerabilities of multiple static analysis tool results. We concluded that one of the most important aspects for accurate classification is the existence of labeled training datasets. Since a new training dataset is needed for every different source code scanned with static code analysis tools we concluded that the training dataset needs to be the smallest possible without compromising the classification accuracy results.

Smaller Training Dataset

In another aspect, the fourth contribution is a comparison of a 10% training dataset versus a more traditional 70% training dataset. The smaller dataset is proven to provide high accuracy, recall, precision and f-measure compared to the larger one, while at the same time offering an efficient solution that is also practical and doable in daily SwA static code analysis process.

Personal Identifier Vulnerability ID

In another aspect, the fifth contribution of the invention is an approach that classifies static code analysis vulnerabilities with a higher degree of accuracy compared to 13 open source algorithms by identifying specific features, and provides a novel algorithm to accurately label vulnerabilities that were not manually reviewed by analysts. The features we are using in our algorithm are the same features we identified in the second part of our invention, with the addition of the Personal Identifier (i.e. author, or source information) as one of the significant vulnerability characteristics. Source information is used if the author is not available for example organization or company name especially for source code that is part of an open source component. In one aspect, we identified the SGD algorithm as the highest performing classifier with the highest accuracy of predicting true or false vulnerabilities, therefore, this is the algorithm we used as a baseline to compare the results of our inventive algorithm. In this invention we developed a novel algorithm called Software Assurance Personal Identifier (SAPI) also called "Vulnerability Identification System" (VISYS), which uses the location, type and subtype features of vulnerabilities together with the personal identifier feature to more accurately identify true and false positive vulnerabilities compared to the SGD.

File Properties

In another aspect, the sixth contribution of our invention is the expansion of the Personal Identifier feature to include file properties (from the file that the potential vulnerability resides) in case the author or source information is not available. We identified the most significant features using feature selection techniques and incorporated them into the SAPI classification algorithm in order to achieve the highest accuracy possible in correctly identifying the true and false positive vulnerabilities.

Empirically Validated

In another aspect, the seventh contribution is extensive experimentation that we conducted to evaluate the validity of our approach. We performed several examples with various weights applied on each feature that we use as input to the SAPI classification algorithm. We used six different datasets, three open source synthetic datasets and three production datasets. We exploited the Information Gain Feature selection on the training set and assigned unique weights per dataset improving further the accuracy results of the SAPI classification algorithm. We ran the SAPI classification algorithm with weights on all six datasets and compared the results of Recall, Accuracy, Precision and F-Measure, to the corresponding ones of 13 open source classifiers that we ran on the same datasets. Our classification algorithm provided better results by successfully labeling more true positive vulnerabilities and at the same time generating fewer false negatives.

Overview of the Invention Approach

The inventive work is different from existing techniques because it approaches the static code vulnerability issue from an organization's perspective. We use the personal identifier, a new vulnerability feature that to the best of our knowledge, it has not been used in any other related invention so far. We also design, implement, and provide a new classification algorithm to detect false and true vulnerabilities with high accuracy.

Related research concentrates on clustering and grouping of the vulnerabilities and comparing different classifiers to identify the one with the most accurate results, or using numerous vulnerability ranking techniques and various algorithms.

The inventive approach combines some of the above research techniques; furthermore, we designed and implemented new methods and algorithms that outperform the existing ones. In addition, the inventive approach is grounded and practical because we have in our disposal actual production software code, and the corresponding result data generated by actual static code analysis tools, as opposed to the synthetic source code used very often by other researchers. Other researchers focus usually on one tool, or one language, or specific types of vulnerabilities, in contrast with the inventive research that engages in exploring the results of many tools, languages and vulnerability types.

Utility

The invention provides assistance to the systems owners and developers to identify the important vulnerabilities for their system, especially the ones that are more likely to cause significant damage and are easier to exploit. The invention completely cleans or significantly reduces the noise that very often is overwhelming and deters analysts and developers from appreciating the static code analysis tools that produce results and mitigating the vulnerabilities.

Relating to static code analysis tool developers, the invention provides static analysis tool developers the ability to use the results and suggestions of this invention to improve their static code analysis tools, towards more precise results with less noise.

Relating to software system developers, the invention helps to identify the true positive vulnerabilities and thereby reduce the noise in the static code analysis results. And consequently, this allows system developers to mitigate the vulnerabilities of their source code and improve its security posture.

Relating to security posture of software, the invention increases the value of the static code analysis reports generated because it already helps identifying the true vulnerabilities with a high degree of accuracy and depicts a more realistic system security posture, while saving critical time and resources compared to manually analyzing all the vulnerabilities.

Relating to SwA code analysts, the size of the training set is one of the biggest obstacles in using machine learning on daily basis to the Software Assurance analysts. Since a new training set is needed for each source code, manually labeling a 70% or 80% training set is not an efficient solution when the static code analysis results usually generate thousands of findings. The invention provides and successfully utilizes only a 10% training dataset that is a viable and feasible approach to implement machine learning in a Software Assurance (SwA) daily process when used with the inventive novel SAPI classification algorithm.

Methodology

This invention is focused on static code analysis vulnerabilities. Based on experience in the software assurance field we realize that reviewing and mitigating the potential vulnerabilities pointed out by the static analysis tools is very often an overwhelming task, because the potential vulnerabilities can be in the range of hundreds of thousands or they include a huge number of falsely identified vulnerabilities. It is very common that the static analysis tools flag a snippet of software code as a vulnerability but after careful review by a developer or an expert the vulnerability does not exist. Since this is quite common, the overwhelmed developers do not trust the results due to the number of errors the static analysis tools make, instead they may decide to disregard all of the potential vulnerabilities. Based on experience in software assurance and discussions with developers it is very common for system owners and developers to ignore the static code analysis results because of the high number of false positives. Unfortunately resources, time, and extra funding are necessary to manually go through every static code analysis finding and determine if it is true or false. Not all system owners can afford the extra resources needed to review all the findings, and it is quite common to bypass checking them, which can lead to security risks for the system since actual and significant findings will be ignored.

The invention is geared toward prioritizing the tool results by using a combination of human input and machine learning that alleviates the developer from manually reviewing all the findings and help him/her focus on the results that are more likely to be true vulnerabilities. The description of the invention is divided into the following main sections: (1) Architecture flow which identifies each task that is performed throughout all phases of the code trail; (2) Examining Types of False Positive Vulnerabilities presents the number and types of false results identified as vulnerabilities of available open source tools and one commercial tool. The goal of this part of the invention is to look for tool trends that will help quickly identify a potential vulnerability as false; (3) Examining Current Classification Algorithms compares the accuracy of open source algorithms on classifying potential vulnerabilities as true or false vulnerabilities. We use stratified sampling to generate the training and test set, and we compare the accuracy of 13 different classifiers. We also identify the most appropriate vulnerability features that are selected to train the classifiers; (4) The SAPI Method introduces a novel approach for predicting the true and false vulnerabilities of static code analysis results. This method includes the design and implementation of the inventive classifier using a stratified sampling technique. This method is materialized through a set of SAPI Classification Algorithms and is compared against existing open source algorithms resulting in the highest accuracy in the predictions of true and false vulnerabilities; and (5) Substituting Personal Identifier (PI) with File Properties we offer an alternative approach to the SAPI classification algorithm that includes file properties, such as filename, last write, length of the file that the vulnerability resides.

Architecture Flow

Referring now to the FIGURES, in one aspect of the the invention we follow the same basic process flow as illustrated in FIG. 1.

First, we scan the code (source code, binaries, bytecode) using a set of open source and commercial tools, we then manually label the static code analysis results into true and false positives. We separate each labeled dataset into training and test set using WEKA, we then perform feature selection and run open source classifiers using WEKA and we run the SAPI classification algorithm using Powershell scripts we developed.

The next subsection offers descriptions and graphical representations of the different types of inputs used in static code analysis.

Binary/Source Code/Bytecode

Figure 2:
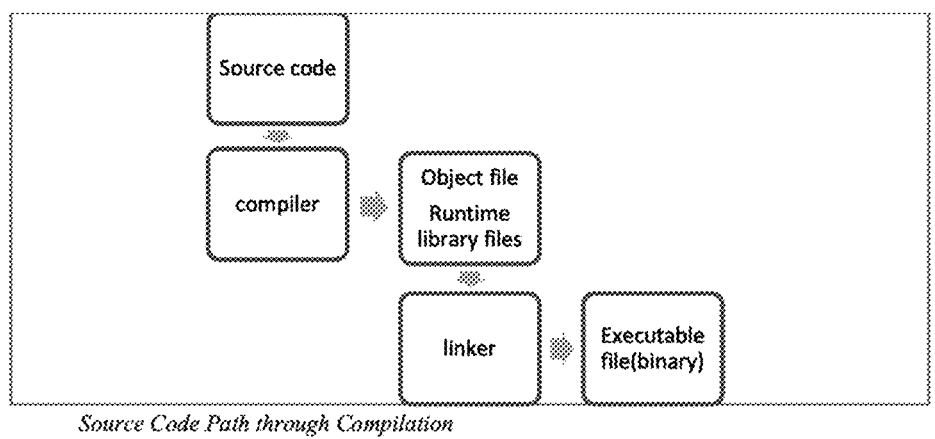
FIG. 2 is a graphical illustration of a process showing source code path through compilation, according to an embodiment.

Referring now to FIG. 2, as we can see in FIG. 2 the compiler uses the source code (language the program is written) as input and converts it into machine language (object file). A linker combines the object file with previously compiled library objects and then creates an executable (binary) file.

Figure 3:
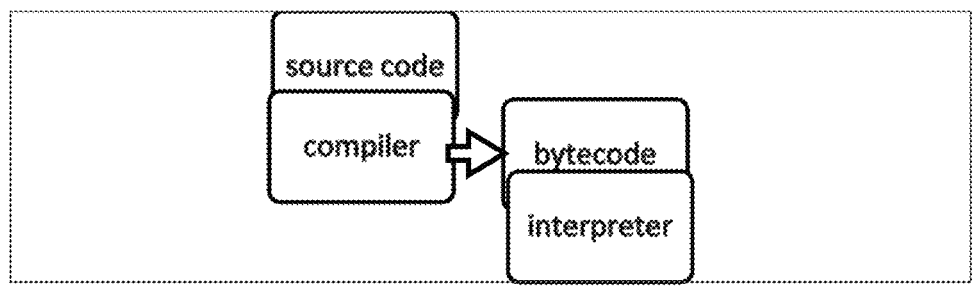
FIG. 3 is a graphical illustration of a process showing source code to compiler, compiler to byte code to interpreter, according to an embodiment.

Referring now to FIG. 3, Bytecode is related to Java, the java compiler (javac) converts the source code into bytecode (machine language). The bytecode is given as input to the Java interpreter, which can run in various Operating Systems. [60]

Static Code Analysis Tools

Figure 4:
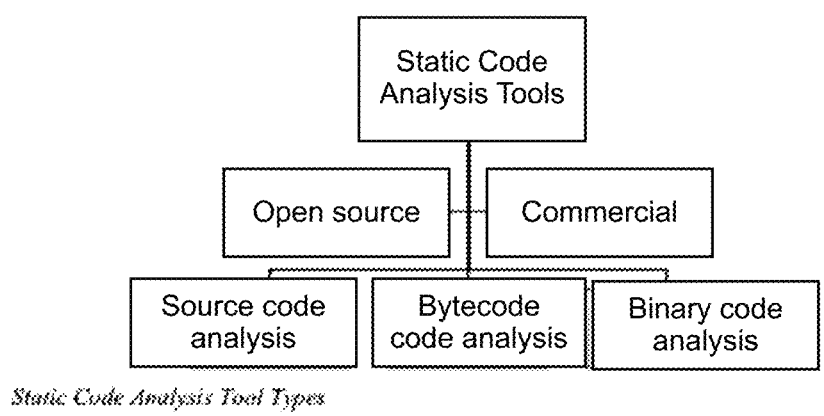
FIG. 4 is a graphical illustration of a process showing static code analysis tool types, according to an embodiment.

Referring now to FIG. 4, the static code analysis tools can be divided into open source and commercial, in addition the tools can be further categorized into source code, bytecode and binary static code analysis tools.

Source code: high level language (e.g Java)
Bytecode: machine language
Binary: executable and installer files.

When we mention the words system or code base or source code as we stated earlier we refer to developer source code that was submitted for static code analysis.

Examining Types of False Positive Vulnerabilities

Figure 5:
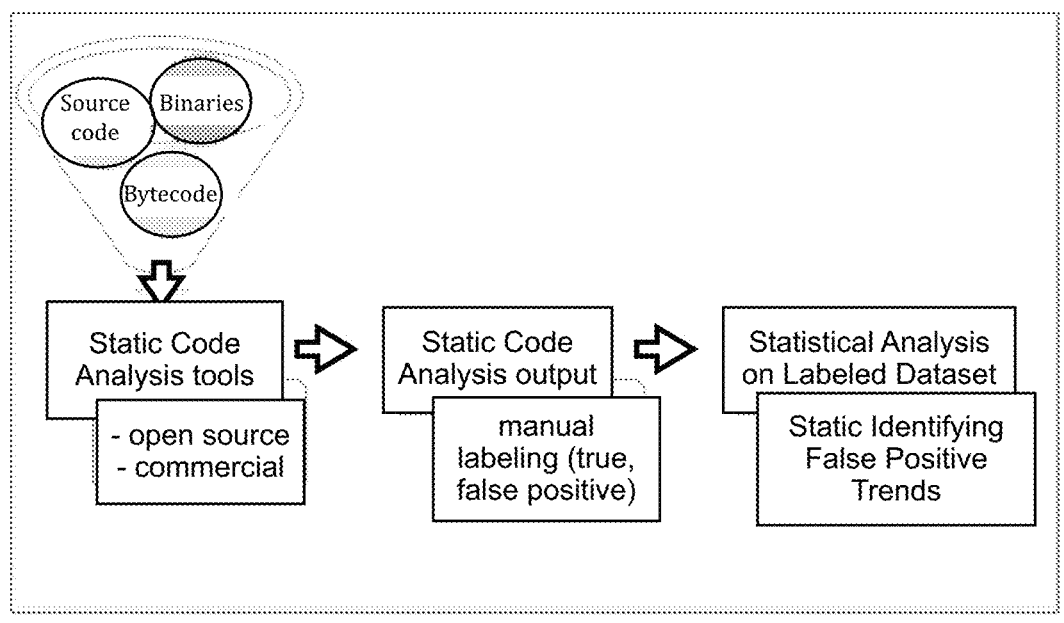
FIG. 5 is a graphical illustration of a process showing false positive trends, according to an embodiment.

Referring now to FIG. 5, in general, the static analysis tools generate results that contain not only true findings but also a high percentage of false positives. Consequently, developers and system owners lose trust on the results of the static analysis tools, and disregard all static code analysis tool results, which also include the true positives. This situation leads to compromising the security posture of the source code because not only false positives, but also true positive findings are ignored, that are critical for the integrity, confidentiality and availability of the system.

A major contribution of this invention is to identify the most common false positive types of vulnerabilities generated by the static analysis tools with a goal to possibly identify individual tool trends. The developers are usually overwhelmed with the static analysis results because the potential vulnerabilities usually range in the thousands and they have to review each one of the findings to determine if it is true or not. Developers and analysts have a high interest at examining the false positive trends of the static analysis tools. It is very important to identify false positives in the source code, because such knowledge can help focus on the tools results that are most likely to be true findings, and ignore the false positives. Concentrating and fixing the findings that are most likely to pose a security risk improves the overall security posture of the system. The key element of accomplishing this is the identification of actual false positives, which can be safely ignored. There is not a lot of information available on the different types of false positives that each tool generates and typical research work usually focuses on code written in one or very few programming languages and/or using a single or few static analysis tools. This section contains a comprehensive and comparative study of several static code analysis tools evaluated on production software systems written in different programming languages.

In order to accomplish the above invention tasks, we need to have access to datasets that are labeled. The process to the labeled datasets was the following.

First, actual production source code was given as input to static code analysis tools, which derived an unlabeled dataset. These commercial systems were scanned by a variety of open source static analysis tools and one commercial. The static analysis results were collected, analyzed, and labeled as false positive or true positive after manual review by an independent software assurance team. The open source or commercial tools we used can be categorized into tools that scan only binaries, bytecode and executable files (.exe, .dll, .class, .jar files etc.) or tools that scan source code (cpp, python,java, etc.).

The tools used in this part of the invention are all static code analysis tools with similar types of output and their results were aggregated together by a commercial framework to remove any duplicates. The tools were chosen based on the languages the different parts of the customer systems are written.

Referring now to FIG. 5, the process flow is shown on the diagram.

The source codes used to obtain the vulnerabilities we examined are all commercial code in production. The source code sizes vary and can range anywhere from hundreds of thousand lines of code to many million lines of code. The systems very often are comprised of different components written in different languages and also may have included open source code. Results from open source and a commercial tool were added and aggregated. Since this was a commercial tool we will refer it as Commercial tool 1 in this invention without referencing the tool name to comply with licensing agreements. The next step is to manually examine the scan results by a team of software analysts for verification. Each analyst reviews his or her own specific part of the source code to verify potential vulnerabilities that were pointed by the tool, as true or false.

There are different severity statuses that the tools assign when they identify potential vulnerabilities: Critical, high, medium, and low. The severity status is assigned depending on the possibility of exploitability and the level of damage that the vulnerability can cause if materialized. So a vulnerability that can cause a severe damage like SQL Injection that is easy to implement due to the lack of safeguards to prevent it may be deemed high from the static analysis tools. However, the same vulnerability may be unlikely to be exploited (if the code implements the appropriate checks), and it can have a severity status of low. The potential vulnerabilities were labeled as either true of false based on a visual inspection of each vulnerability by the analysts. In addition, each vulnerability was peer reviewed by a different set of analysts for further validation.

However, only 10-20% of the total potential tool vulnerabilities were manually evaluated by the software assurance team since it is impractical to examine code at a larger percentage due to an overwhelming number of potential vulnerabilities per scan.

The vulnerabilities that were manually evaluated were those identified with the highest severity status by the automated tools.

Labeled vulnerabilities by independent software assurance analysts were used for this study and it is estimated that 14% of the potential vulnerabilities (14% of the 10-20%) that were manually evaluated and labeled were deemed by the analyst as false positive. The vulnerabilities are associated with the Common Weakness and Enumerations (CWE) "a community-developed list of common software security weaknesses. It serves as a common language, a measuring stick for software security tools, and as a baseline for weakness identification, mitigation, and prevention efforts" [30]. The CWEs website is updated and maintained by MITRE and according to the website "CWE is sponsored by US-CERT in the office of Cybersecurity and Communications at the U.S. Department of Homeland Security". We believe that the information provided in this invention is an excellent starting point to identify the most common false positive static code analysis vulnerabilities generated and can be used as a guide to better understand the vulnerabilities and their relationships with the tools. The reason behind this, it is that very often the same tool may generate the same type of false positive vulnerability, and it is important to identify such a trend.

Preparing Datasets and Comparing Current Classification Algorithms

Figure 6:
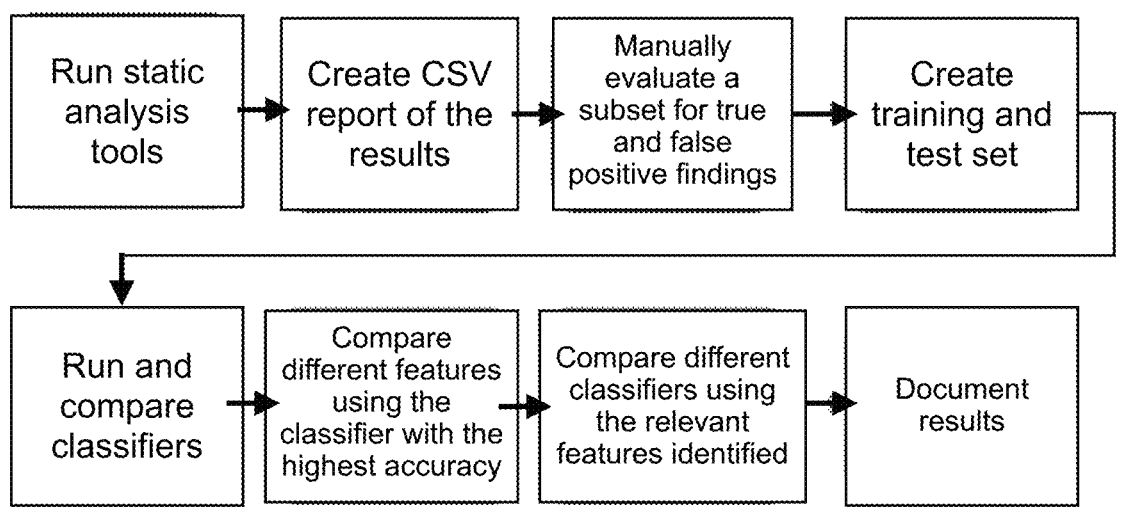
FIG. 6 is a graphical illustration of a process showing a process for preparing datasets and comparing algorithms, according to an embodiment.

Referring now to FIG. 6, static code analysis tools find potential vulnerabilities only by accessing the source code and without executing it. The invention is geared towards helping the software assurance analysts to label the vulnerabilities with higher accuracy. The static analysis tools do not always see the whole picture, e.g. when the vulnerability has been mitigated somewhere else in the code. Also, it is not uncommon for the static tools to make mistakes when identifying vulnerabilities. Therefore, human analysis and developer input are necessary in order to verify vulnerabilities that are marked as true or false positives. However, human analysis on all the vulnerabilities is not always possible due to the high number of vulnerabilities per static code analysis scan (usually they range in the thousands). A solution that this invention provides is to combine human analysis with machine learning to predict vulnerabilities with high degree of accuracy. The software assurance analyst or the developer can manually examine a small sample of the static code analysis results; subsequently, we use machine learning to predict if the remaining vulnerabilities are false positive of true findings. The overall approach consists of the following phases.

First, the source code is scanned using multiple existing tools, and the results are aggregated into a CSV file of potential vulnerabilities.

A subset of the potential vulnerabilities is then selected based on the severity status to identify the most critical ones for manual examination and label the vulnerabilities as true or false positive.

Following that, a training and a testing set are created using WEKA and the stratified sampling technique, and 13 different open source classifiers are applied on the testing dataset. The classifier with the highest accuracy is to be used in order to determine and validate the best feature selection results.

Finally, all the classifiers were tested again with the relevant features identified in the previous step and the results (false and true positive) were recorded. FIG. 6 illustrates the process used.

For this phase of the invention only a limited portion of the reviewed vulnerabilities were used, because this dataset was one of the first datasets we had available with false positive vulnerabilities but the ratio of true to false positive vulnerabilities was so disproportional that we had to remove a lot of the true positive vulnerabilities and keep all the false positive in order to be able to conduct the examples. We also decided to use a smaller training set compared to the test set in order to offer a viable solution for a software assurance process that can be streamlined. Labeling the training set can be very time consuming and by making the training set as small as possible provides a feasible approach on a SwA daily routine. The results of the following tools were aggregated: Checkstyle, Dependency-Check, FindBugs, Commercial 1, JSHint, PHP_CodeSniffer. Since only a subset of the results was used, the training and test datasets included the results of the following tools: Commercial 1, PMD and Findbugs. The majority of the vulnerabilities of the dataset used for the examples were located in Java files. The WEKA software was used to run the classifiers and to select the sample for the training set, via stratified sampling. Different open source algorithms (such as Naïve Bayes, J48, Random Forest, SGD, etc.) are to be run and the results to be compared.

The original static code analysis results dataset contained the following features per vulnerability:

1. ID, Severity, CWE, Rule, description, Tool, Location, Path.

Examining each one of these features we can preserve or eliminate them based on how they may identify a true finding. For example, ID is generic and unique for each finding. It does not help in identifying whether a finding is true or false. Therefore, we can safely discard it. Similarly, the feature "severity" applies to many of the findings, since severity is only one of five categories and it may partially assist in identifying some of the true or false findings. In addition severity for the same type of finding varies depending on the exploitability of the finding and it is not a clear indicator on whether the finding is a true or false vulnerability.

On the other hand, "description" is quite a useful feature since it contains significant information about the finding, therefore, it is important to keep.

CWE contains the type of finding, and also it determines the Rule. Therefore, it is safe to eliminate the Rule and keep CWE.

The term "Tool", as used herein, refers to the name of the static analysis tool and it does not provide any important information on identifying a true or false finding. A finding that is identified as true by one tool, maybe identified as false by other tools. Therefore, it is not deemed as important as other features, e.g. description.

In order to validate the inventive approach we described above on which features are the most relevant we decided to use machine learning Waikato Environment for Knowledge Analysis (WEKA) and best feature selection to compare the inventive results to the WEKA best feature selections methods. WEKA classifiers were also used to further evaluate the best feature approach by comparing the results of the classifier using the best features versus all the features or different combinations of features as input. Below are the three features that based on the inventive work contribute more significantly into the accurate prediction of false and true vulnerabilities.

1. CWE, Path (without the filename), Description.

Figure 7:
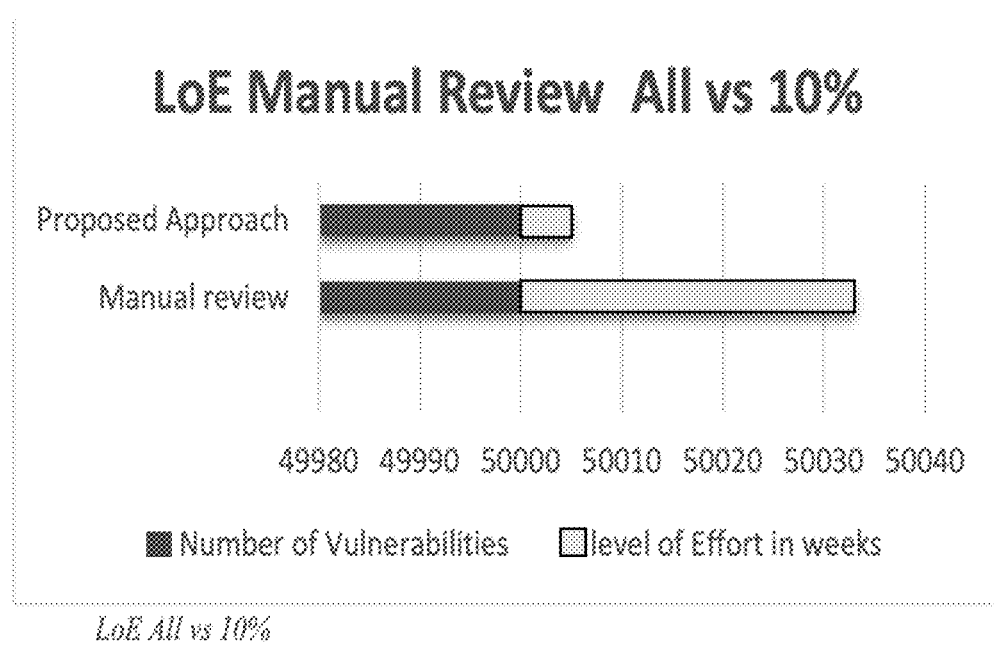
FIG. 7 is a graphical illustration showing the level of manual review effort to review vulnerabilities over weeks compared to the inventive process, according to an embodiment.

Introducing the SAPI (Software Assurance Personal Identifier) (or Vulnerability Identification System) Classifier Referring now to FIG. 7, in this invention we utilized many static analysis tools as opposed to other research where it is very common to use only one. We also used a variety of vulnerabilities (e.g., sql injection, buffer overflow, hard coded passwords, null pointer exceptions, error handling). Below are the major differences between the inventive approach and the current state of the art in software assurance:

We used multiple tools

We used a variety of vulnerability types

No historical data was used as input, as opposed to other research described in related work Ground truth was generated by software assurance analysts There was no need to alter the code base (reducing or backward slicing as many research we have reviewed have done) or the vulnerabilities to accommodate the inventive classifier.

The dataset for this study is a code base that is used in production.

Adding the Personal Identifier (PI)

We added the personal identifier (author or source information) combined with the location feature as a new feature and the personal identifier combined with the type of the vulnerability feature as an additional new feature with the two values separated my comma. The personal identifier feature is important for the classifier input since the authors very often cut and paste source code, so if the same type of vulnerability is found in different places in the source code most likely has the same basic vulnerability characteristics and these characteristics will be a great resources on identifying the vulnerability as true or false. We assume the personal identifier will be distinct for every system that will go through a static analysis.

Using Only 10% for Training

We used two training sets of different sizes: The first one emulates real life scenarios where developers and software assurance analysts are not always able to go through a lot of vulnerabilities. In this case, we use a smaller training dataset, approximately 10% of the entire dataset. The remaining 90% was used as the test set. The second training set reflects a common practice in data mining using 70% of the dataset for training the classifiers and the remaining 30% as the test set.

In the invention we compare how credible the 10% training and 90% testing is, compared to the typical 70% training and 30% testing that has been extensively used. The inventive sampling technique is stratified fold sampling, and the test set was almost 90% of the dataset. Since it is more feasible to manually label a 10% training set than a 70% set, we believe that in the future the inventive technique will be used to make predictions on static code analysis results regardless of the individual code base characteristics.

There is a very specific reasoning behind the decision to use a 10% training set. We would like the invention to be used and have an impact on actual day-to-day operations environment. Static analysis code results are usually in the tens or hundreds of thousands of potential vulnerabilities and manual examination of all of them is impractical.

It makes little sense to manually label 70% or more of each static code analysis results to generate the training set because the majority of the work will have been performed and there is no value in using machine learning. Hence, if we use the smallest possible training set and use classification to predict the false and true positive vulnerabilities then the value of using machine learning increases significantly.

Another reason is that we cannot use the same training dataset for different scan results because the results are unique per scan, for example the location and subtype features are unique per software going through the static code analysis process. We provide that for every software system static code analysis results dataset to generate a small training set, then manually label the training set and use the inventive SAPI to make predictions to the remaining of the raw static code analysis results.

These are the main reasons for a new training set for every different system that needs to be manually labeled. Therefore, the training set must be kept as small as possible.

The stratified sampling technique on WEKA divides by default the dataset into 10 folds, and the 1/10th of the dataset is the inventive starting point as a training set but we are also exploring making the training dataset even smaller, we will also look into bigger training set only if the 10% training set does not offer satisfactory results when used as an input for the classifier.

Impact of Using 10% of Training Set

Below is the direct impact the invention has on a production environment by using the 10%. An average software system with about 2 to 3 million lines of code when scanned static code analysis tools generates about 50,000 static code analysis findings. Software assurance analysts and developers must verify and fix each one of the findings. On average it takes a person about a day to go over 100 findings just for verifying whether a finding it true or false, not does not include any fixing. Overall, a team of three analysts/developers will most likely review about 3,000 findings in a period of two weeks.

To go over all 50,000 vulnerability findings it will require an average of 33 weeks for a team of three people. As we can see it will be almost impossible and very expensive to dedicate this time to review all static code analysis vulnerability results. Using the inventive approach the team of analysts/developers has only to manually review 10% of the static code analysis findings, an average of only four to five weeks. An estimate of 28 weeks of manual review and labeling for the remaining 90% of the findings will be saved by using the inventive approach. The amount of savings in cost, resources and time is tremendous (FIG. 7).

SAPI Classification Algorithm Calculation for Identifying False and True Vulnerabilities The SAPI classification algorithm we provide is designed to assist in identifying the true and false positive vulnerabilities generated by static code analysis tools. It takes into consideration the vulnerability location (path without file name), CWE, subtype and personal identifier (author/source)

Specifically for the inventive calculations we used the CWE, Path and Subtype features that we identified in a previous step of the invention, in addition to PI.

Below is an explanation of the terms used in the inventive calculations:
1. C is the CWE vulnerability.
   S is the CWE subtype (part of the description field usually function or parameter name).
   A is the author.
   P is the Path.
   CA is the combination of author and CWE. We distinguish the vulnerability based
2. on the CWE and author or source information (personal identifier). Two vulnerabilities are different for example, if the CWE is the same but have different authors or vice versa.
3. CP is the combination of Path and CWE. Consistently we distinguish between the vulnerability by the location that is found. So two vulnerabilities with the same CWE are different if the location is different. The same principle applied to the CLA and CAS identified below.
4. CPA is the combination of CWE, Path and Author.
   CAS is the combination of CWE, Subtype and Author.

We calculate C, the OTP as R(C) based on the sample training set. The same principle to calculate the rest of the ratios for the selected features applies for the S and the P, A, CA, CP, CPA, and CAS OTP calculations. Then, we average all the above ratios together, but we utilize the CPA and CAS twice in the inventive algorithm. This is because we identified that the author, type, subtype and path information, if present in the dataset in combination, increase the possibility of labeling the vulnerability correctly. The CPA and CAS features distinguish each vulnerability and help identify patterns and similarities between true and false vulnerabilities. Below is the algorithm. The algorithm goes through each individual vulnerability and calculates the probability of being a true positive. We used a threshold θ to separate the true from the positive vulnerabilities. A θ >0.50 indicates that the vulnerability has a greater than 50% chance of being true vulnerability. A θ<0.50 indicates that the vulnerability is more likely to be a false positive. The threshold can be adjusted based on expert knowledge for each system. The SAPI classification algorithm labels each vulnerability as either true of false positive.

K starts at 4 since each finding has at least four features (CWE, Path, Subtype and Personal Identifier), n is the number of findings and a counts the number each time the combination of CiPjAg and CiAjSg appears.

As shown in Table 1, also in FIG. 16, the SAPI algorithm 1 with a personal identifier.

fluctuate in different parts of the code. In that case, the vulnerability in one iteration of code reuse may be false positive and in the other, true positive. In this example, more features will offer a better estimate. One may learn that the probability of this type of vulnerability is true in general, or the probability as used in this location is consistent, or that code written by this author generates false positive or true positive vulnerabilities. We need to take into consideration all the features mentioned above independently and in correlation with each other to have a more complete picture of the vulnerability and the possibility to be either true or false.

Substituting PI with File Properties

```
ALGORITHM 1
Input:Import all findings
Output:Label Findings as True or False Positive
"Read All Findings"
While Not EOF do
"Go through each finding where feature Fi exists where i=1,...n,
j=1,...n and g=1,...n." Initialize k=4, a=1
Get Fi
While Fi exists do
Calculate probabilities R(Ci),R(Ai), R(Pi), R(Si) "Check if the following combinations
exist" "Calculate combination probabilities"
begin
switch 1 do
case CiPj Exists do calculate R(CiPj), k=k+1
end
case CiAj Exists do
calculate R(CiAj), k=k+1
end
case CiPjAg Exists do
calculate R(CiPjAg), k=k+1, a=a+1
end
case CiAjSg Exists do
calculate R(CiAjSg), k=k+1, a=a+1
end end
end
SAPI(Fi)=((( R(Ci) + R(Pi) + R(Si) + R(Ai)+ R(CiAj) + R(CiPjAg) + R(CiAjSg)/k)+
R(CiPjAg) + R(CiAjSg))/a
If SAPI(Fi)>θ then
finding = TP (vulnerability)
else
finding = FP (Nonexistent vulnerability)
end end
end
```

It is common practice for developers to cut and paste code when developing software. For example object oriented programing is a highly used programming practice that provides many benefits, with code reuse one of the most important benefits of the practice.

Based on observations made on multiple datasets after static code scans, it was very common to see that the same vulnerabilities were repeated multiple times in the source code in different areas of the code. By observing the repetition of the same vulnerabilities in different areas in the code, we realized that in many cases the common identifier in the vulnerabilities was the author or the source of the code.

Developer's experience, knowledge and programing style are additional factors that make the personal identifier an important feature to consider when looking at static code analysis results and making predictions based on them. On the other hand, only CPA and CAS probabilities are neither sufficient, nor applicable to all situations to correctly identify vulnerabilities. In many cases we may have only one of the two above features available or both missing. In some cases, the same subtype and author with the same file path may In this part of the invention we use a combination of different features to substitute for the personal identifier, because the personal identifier (author, source) is not always available. It is not common practice for developers to write their names on each file in the source code, therefore the personal identifier information will not be available the majority of the times. We replace the personal identifier with file properties, specifically with the file name, file length, and last write (date the file was last modified) information of each file where the potential vulnerability resides. The rationale behind this is as follows. File properties can be used to identify the unique characteristics of a finding's location (the file containing a potential vulnerability). It is logical to deduce that if the code is reused often the author will be the only person that usually makes changes to the file and will reflect the author's unique coding style, which together with the coding expertise and knowledge can determine the number and type of findings (potential vulnerabilities). For example, assuming that a specific subtype of vulnerability is found in a file and it is a false positive, it is extremely likely that if the same subtype of potential vulnerability is found elsewhere in the same file, then it should be false positive too. In addition, very often programmers reuse the same file in different locations, so the filename, the last write, and file length information will match. Therefore, file properties is an alternative option that compensates for the lack of author or origin information of the source code.

Since we substituted the personal identifier, which is one feature with a composite finding feature consisting of three other feature characteristics (file name, last write, file length) we decided that we need to perform multiple examples with different combinations of the new file properties features and the existing features of each finding. The goal of the examples was to identify the features and their combinations that will assist on labeling the potential vulnerabilities as true or false positive using the SAPI classification algorithm with high accuracy. Every new combination we performed gave us feedback to remove or add a new combination at the next example. Also by including some combinations or features twice in the calculations very often we saw an improvement to the classification results. The reason of course is because some features provide more accurate information to the classifier than others.

Feature Selection

We used Information Gain for feature selection which measures the information obtained for prediction of a class by the presence or absence of a feature to identify the most significant features for the SAPI classification algorithm in order to differentiate between true and false positive findings.

Information gain measures how much "information" a feature gives us about the class.

- Features that perfectly partition should give maximal information, meaning that the features that contribute on 100% accuracy in class prediction provide the maximum information that can be provided to the classification.
- Unrelated features should give no information on class prediction thus do not contribute at all on the classification.
- It measures the reduction in entropy.
- Entropy: (im)purity in an arbitrary collection of examples (the measure of randomness in the information, how messy the data is)
- Maximized when elements are heterogeneous (no conclusions can be drawn), minimized when elements are homogenous (there is a relation between the elements). Below is the Information gain definition.

Entropy is defined as $$H = -\sum_{i=1}^{K} p_k \log_2 p_k$$

Then the change in entropy, of Information Gain, is defined as:

$$\Delta H = H - \frac{m_L}{m} H_L - \frac{m_R}{m} H_R$$

Where m is the total number of instances, with mmkk instances belonging to class k, where K=1, . . . , k.

H=Entropy

Pk=proportion of instances belonging to class(k) (K=1, . . . , k).

We used the information gain to identify the most prevalent features for some of the datasets to determine if the results are consistent across all of them. The inventive input consists of all the features plus the file properties: ID, severity, status, CWE, rule, tool, location, path and line number, file name, file length, last write.

After we identified the best feature combination overall to be input to the SAPI classification algorithm we varied assigning weights to each feature for every training dataset. The Information gain algorithm assigns a weight per feature, the higher the weight the more information the feature provides to the classifier. Since each dataset has unique characteristics we used the weights to found out if the results from the metrics (Accuracy, Recall etc.) are still the same, or not. The final version of the classifier we provide implements the information gain feature selection method and utilizes the weights assigned per feature per dataset.

Observed True/False Positive Ratio

We define Observed True Positive ratio (OTP) as the ratio of true positives findings divided by the total number of findings as the training set.

$OTP=TP/TP+FP.$

We defined Observed False Positive Ratio (OFP) as the ratio of the number of false positive findings over all in the training set:

$OFP=FP/TP+FP.$

We noticed that very often the datasets may lean towards more true positive or more false positive results. We thought that the OTP or OFP ratio should be considered as input in some of the SAPI calculations since the majority of the datasets lean either towards more false positives or more true positives. We added the ratio as one extra feature in some of the versions of the SAPI classification algorithm in order to see whether we should incorporate the ratio as an extra feature used for the class prediction. In addition we use the OTP or OFP ratio as one of the θ thresholds values that we performed and compare the accuracy results.

Calibrating/Tuning/Determining the Threshold

As we discussed the threshold can be an important parameter on labeling the results as true or false positive. Anything above the threshold will be labeled as true positive and anything below as false positive.

Below we offer some suggestions on the values the threshold can be assigned:

- The common threshold value of 0.50.
- OFP, for example if the OTP value is 0.60 then the threshold value will be 1−0.60=0.40 (or OFP ratio). Anything above 0.40 will be deemed true positive. For dataset 1 the OOTP was 0.797 and the threshold value can be set to 0.203(OFP).
- If the OTP is less than 0.50 then we can use the OTP ratio as the threshold. For example in dataset 1 we can use a threshold of 0.25 that is also OTP ratio.
- Assigning to the threshold the smallest value either the OTP or OFP ratio. The reasoning for the smallest value is that more results will be included in the true positive and we will avoid the mistake on missing critical vulnerabilities that can do great harm to the security of the system.

After we used different thresholds values with the test datasets (after SAPI was run and the results were labeled), we decided to vary instead with different thresholds on the training set and test if the threshold that provides more accurate classification of the false and true false findings in the training dataset is the one that actually provides also the most accurate labeling of the results for the test datasets.

Referring now to FIG. 17, and shown below is the algorithm to determine the threshold, OTP is the true positive ratio and OFP is the false positive ratio.

```
ALGORITHM 2 If OTP < OFP then
    θ = OTP
else
    θ = OFP
end
If result of SAPI classification algorithm for finding fi > θ then
    finding = TP (vulnerability)
else
    finding = FP (Nonexistent vulnerability)
end .
```

Different SAPI Classification Algorithm Versions

Figure 8:
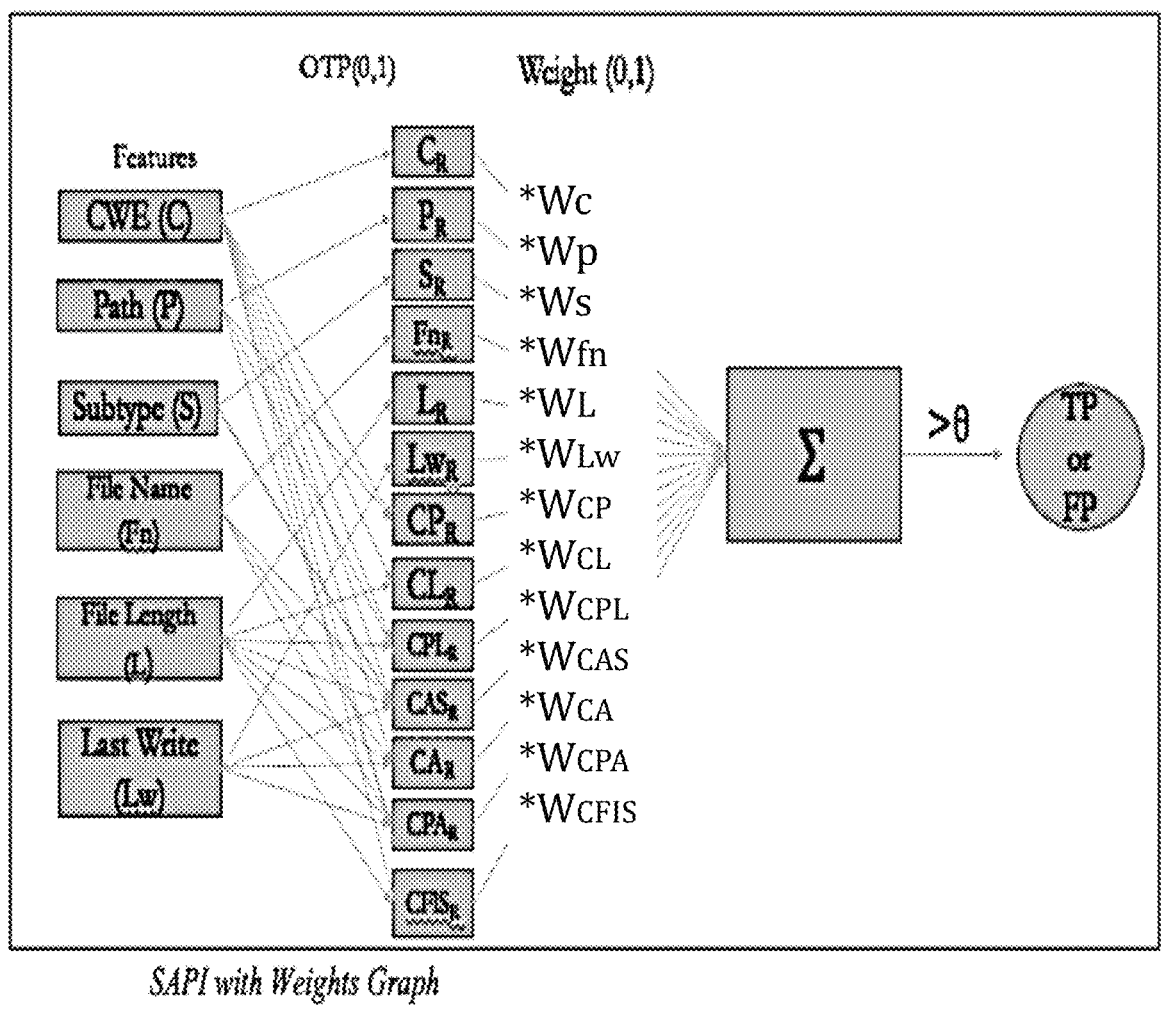
FIG. 8 is a graphical illustration showing a SAPI with weights graph, according to an embodiment.

Referring now to FIG. 8, also contemplated as within the scope of the invention are different variations of the SAPI classification algorithm based on the original one in search of any possible improvement compared to the existing open source classifiers. SAPI classification algorithm 3 (Table 3) provided the most accurate classification results compared to all other SAPI classification algorithm with various feature combinations, and also SGD. The majority of the differences on the multiple SAPI versions were in the number of features and feature combinations that were used as input and the addition of the true or false positive ratio. In addition we used the Information Gain algorithm results to identify the features that help the algorithms distinguish between the true and false positive findings.

Below is an explanation of the terms used in the Algorithm 3 and Algorithm 4 that utilize file properties instead of author or source information:
C is the CWE vulnerability
S is the CWE subtype.
P is the location/path
FN is the filename where the vulnerability resides
FL is the length of the file where the vulnerability resides
LW is the last write information (date) of the file where the vulnerability resides
CP is the combination of CWE and Path (location).
CL is the combination of CWE and File length
CPL is the combination of CWE, Path and file length.
CA is the combination of author and CWE and A (filename, file length, last write).
CPA is the combination of CWE, Path and A (filename, file length, last write)
CAS is the combination of CWE, Subtype and A (filename, file length, last write).
CFlS is the combination of CWE, File length and sub type.
Added an extra feature called "bias" which is the OTP ratio of all the findings of the training dataset.

We calculate C OTP of occurring as R(C). The same principle we apply to calculate the rest of the OTP ratios for the selected features. Then, we average all the above ratios together.

The next version of the algorithm we provide (algorithm 4 below) uses weights for each input and the threshold is calculated in advance by running the SAPI classification algorithm in the training set. We identified the best SAPI feature combination for classification purposes and we decided to vary the process further by assigning weights to each SAPI feature used as input with unique values per dataset. The reasoning behind this decision is that each dataset has unique characteristics and all features may not contribute equally in the classification of the vulnerabilities as true or false. For example the subtype feature may provide more important information than the location feature in one dataset when used as input to the classifier compared to another dataset. We would like to be able to determine and assign weights to each feature compared to the information that the features provide to the classifier for each specific dataset.

We used the information gain algorithm and the SAPI classification algorithm on each training set. Specifically we ran the information gain best feature selection and SAPI on the training set because the findings will always be labeled as either false or true, so the information gain method will be able to assign weights on each feature based on the labeling of each finding. Each weight per feature can then be used when we run the SAPI classification algorithm to further improve the classification accuracy on the test set. In addition since all test sets used in this invention are also labeled we can use the weights derived from the training set after we normalized them (information gain weights are not normalized) as input on SAPI on the test set.

Below we display the final version of the SAPI classification algorithm that incorporates the weights into the calculation.

To summarize the approach, we introduced a novel classifier, called SAPI, and we also created additional variations of it using different combinations of features.

We introduced the Personal Identifier (PI) as an additional feature that determines TP and FP In cases that PI is not available, we identified substitute features that also identify TP and FPs. We also decided to use a smaller training dataset, only a 10% of the original dataset to address the implications of actual commercial environments. Finally we identified a method to produce weights for the features based on thresholds that were applied on the training set. Next, we verified the methods and techniques by experimentation and measure Precision, Recall, F-measure and Accuracy.

Implementation and Evaluation

The identification and explanation of the metrics used for the EXAMPLES, the datasets we used for every phase of the invention, and the EXAMPLES we conducted, are provided below.

Furthermore, we provide an overview of the results of the EXAMPLES and how they support the approach. The invention is focused on identifying true and false positive findings. There is a high percentage of false positive findings in the generated results of the static analysis tools. Consequently, developers and system owners lose trust on the results of the static analysis tools, and disregard all static code analysis tool results, which also include the true positives. This situation leads to compromising the security posture of the source code because not only false positives, but also true positive findings are ignored, that are critical for the integrity, confidentiality and availability of the system.

Metrics Used

In this section we identify a list of metrics we used to evaluate the EXAMPLES. We provide information and explanation of the different metrics used to validate the methodology and the algorithms.

These metrics are calculated based on the results of the software code by the static analysis tools.

The following definitions are necessary for the metrics we use:

TP=True Positives (Truly identifying an incident as a vulnerability). An example of this occurs when a static analysis tool identifies a SQL Injection vulnerability, and after close examination by an analyst the vulnerability is found to be true.

FN=False Negatives (Falsely identifying an incident as a non-vulnerability). An example of such vulnerability is when the vulnerability exists but the tool does not report it. It can be any type of software vulnerability (input validation, error handling, etc.)

FP=False Positives (Falsely identifying an incident as a vulnerability). The scanning tool may detect a variable or a function as dead code (declared, but not used) but the variable or the function may be initialized or called a little further in the program.

TN=True Negatives (Truly identifying an incident as a non-vulnerability). For example, after using a classifier we predict that a vulnerability (e.g., sql injection) that the tool identifies is a false positive and upon manual examination we verify that the classifier prediction was accurate it was not a vulnerability.

TF=True Finding that is either true positive or true negative.

FF=False Finding that is either a false positive or false negative.

The metrics that we use are:

Accuracy $$\text{Accuracy } A = \frac{TP+TN}{TP+FN+TN+FP}$$

is the percentage of the vulnerabilities that were identified correctly as either true positive or true negative.

Recall

Recall is the percentage of true positive vulnerabilities that were identified. The higher the Recall the more true positive findings are identified and less false negatives.

$R=TP/TP+FN$

Precision

The Precision is the percentage of the vulnerabilities identified as true positive that were correct. The higher the precision the more accurate are the results returned for false positive.

$P=TP/TP+FP$

F-Measure

F-Measure of the system is defined as the weighted harmonic mean of its Precision P and Recall R, that is:

$$F = \frac{1}{a\frac{1}{p} + (1-a)\frac{1}{R}},$$

where the weight: $\alpha \in [0,1]$.

The balanced F-Measure, commonly denoted as F1 or just F, equally weighs Precision and Recall, which means $\alpha=\frac{1}{2}$. The F-measure can be written as $$F1 = \frac{2PR}{P+R}.$$

The F-measure can be viewed as a compromise between Recall and Precision [130]. It is high only when both Recall and Precision are high. It is equivalent to Recall when $\alpha=0$ and to Precision when $\alpha=1$. The F-Measure assumes values in the interval [0, 1]. It is 0 when no relevant documents have been retrieved, and is 1 if all retrieved documents are relevant and all relevant documents have been retrieved.

False Positive Rate (FPR) also called Specificity [63] is the probability of falsely rejecting the null hypothesis for a particular test. The false positive rate is calculated as the ratio between the number of negative events wrongly categorized as positive (false positives) over the total number of actual negative events (regardless of classification):

$P=FP/FP+TN$

True Positive Rate (TPR) also called Sensitivity or Recall measures the proportion of positives that are correctly identified as such [64].

Figure 9:
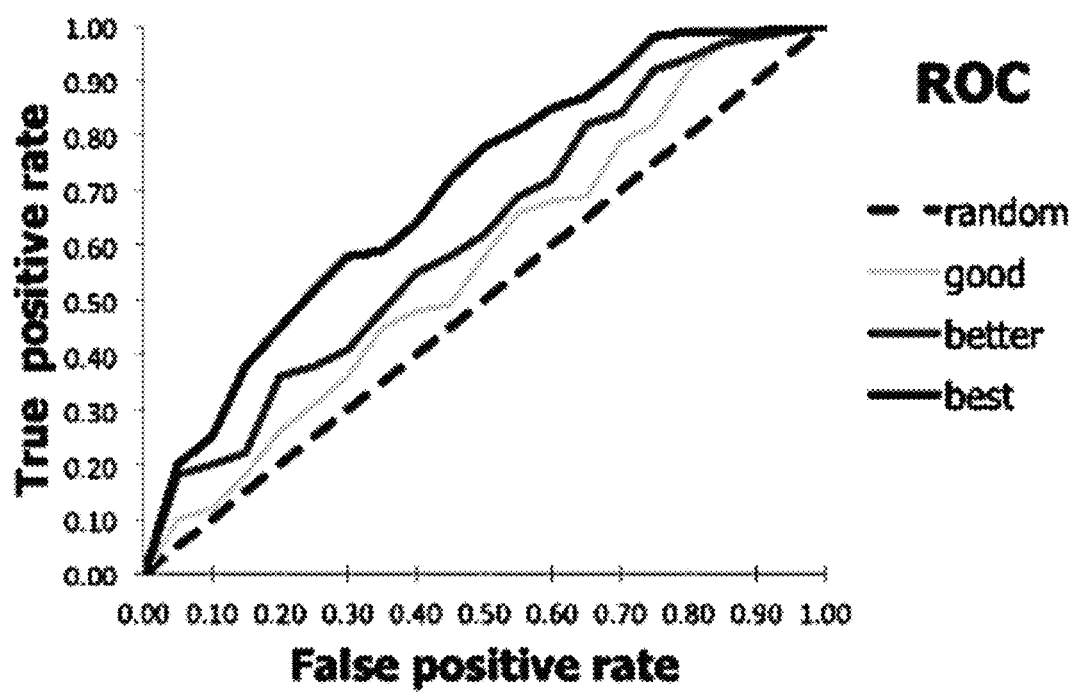
FIG. 9 is a graphical illustration showing a true positive rate against a false positive rate, according to an embodiment.

Referring now to FIG. 9, a ROC curve [56] demonstrates several things. It shows the tradeoff between sensitivity and specificity (any increase in sensitivity will be accompanied by a decrease in specificity). The closer the curve reaches the Y-axis (FIG. 8) and towards the top section of the figure the more accurate the test. The closer the curve comes to the 45-degree diagonal of the ROC space, the less accurate the test. As shown in FIG. 9, the chart [62] below identifies visually that a curve that is closer to the left and top shows that the algorithm provides more accurate and balanced results between the true positive and true negatives.

Referring to FIG. 9, Area Under the Curve (AUC): [57] Accuracy is measured by the area under the ROC curve. An area of 1 represents a perfect test; an area of 0.5 represents a worthless test.

Stochastic Gradient Descent (SGD), also known as incremental gradient descent, is a stochastic approximation of the gradient descent optimization method for minimizing an objective function that is written as a sum of differentiable functions [155]. In other words, SGD tries to find minima or maxima by iteration. It implements stochastic gradient descent for learning various linear models (binary class SVM, binary class logistic regression, squared loss, Huber loss and epsilon-insensitive loss linear regression) [153]. Globally replaces all missing values and transforms nominal features into binary ones. It also normalizes all features, so the coefficients in the output are based on the normalized data.

For a more detailed explanation, suppose an objective function is L(D, θ). If the objective function can be decomposed as the following, $L(\theta,D)=\Sigma_{i=1}^{|D|}L(\theta;Di)$ Where Di indicates the i-Th example (sometimes Di is a batch instead of one example), we can make the process stochastic. To make each step computationally efficient, a subset of the summand function is sampled. The procedure can be described as the following pseudocode:

Initialize θ
Repeat until convergence
Sample n examples
For each example sampled Di
1. θnew=θ−α∇L(θ;Di)
2. θ=θnew
Where α is the learning rate.
Examples False Positive Study
Datasets A total of 21 software systems were used as input to the static code analysis tools. The ground truth of identifying the TP and FP was generated by a team of software assurance analysts that manually evaluated the static code analysis results of the 21 systems. We performed statistical analysis on the vulnerability results generated by ten open source and one commercial static analysis tools. In some cases more than one tool generated the same false positive vulnerability. It is important to note that generating the ground truth was a first step performed by a team of software assurance analysts who were not familiar with the software systems they analyzed and may miss a lot of false positives. However, the developers of the software systems we believe will be able to find more false positive vulnerabilities since they have better knowledge of each system used in this study.

Example Setup and Static Analysis Tools

All the examples where performed on computers, running Windows 10 and Windows 7 Operating Systems with 16 and 8 GB of RAM. We utilized 21 commercial code bases (we scanned the code bases with static code analysis tools and used the results for the examples). We obtained results from 10 static code analysis tools (open source and commercial).

Below is the list of the open source tools we used:
1. Brakeman [21]
2. PHP_CodeSniffer [113]
3. Cppcheck [33]
4. FindBugs [45]
5. FxCop [46]
6. Gendarme [47]
7. JSHint [80]
8. PMD [115]
9. Pylint [117]

Table 3—Static Analysis Tools Trends

Table 3 below identifies the CWE number, rule name (which is the CWE definition), tool and number of false positives for each CWE. The table displays only the results of each tool that has at least 50 or more false positive vulnerabilities in order to focus on the tools that offer a significant amount of false positive. The relationship between each tool and type of vulnerability can be derived from the data gathered as shown in this table. We observe that the highest number of false positive vulnerabilities are generated by Commercial Tool 1 and they are related to CWE 310 (cryptographic issue). It is very common practice for the developers to use random( ) to generate a number and the tool will flag it as a potential vulnerability. But this may be a false positive if the random number generator is used for other reasons and not for cryptography. So the tool was correct in identifying random( ) usage but it failed to detect that the number generated is not used for cryptographic reasons. Manual examination can correctly detect the above distinction and mark the vulnerability as false positive but the tool fails to make this distinction.

TABLE 3

Number of False Positives per CWE and Tool in decreasing order

| CWE | Rule | Tool Name | False Positives |
|---|---|---|---|
| 310 | Cryptographic Issue | Commercial Tool 1 | 2103 |
| 398 | 7PK - Code Quality | PHP/CodeSniffer | 1052 |
| 74 | Injection | Findbugs | 988 |
| 398 | 7PK - Code Quality | Pylint | 952 |
| 398 | 7PK - Code Quality | PMD | 745 |
| 255 | Credentials Management | Commercial Tool 1 | 423 |
| 287 | Authentication and Authorization | Commercial Tool 1 | 334 |

TABLE 3-continued

Number of False Positives per CWE and Tool in decreasing order

| CWE | Rule | Tool Name | False Positives |
|---|---|---|---|
| 255 | Credentials Management | PMD | 325 |
| 710 | Improper Adherence to Coding Standards | PMD | 325 |
| 94 | Code Injection | FindBugs | 306 |
| 13 | Password in Configuration File | Commercial Tool 1 | 201 |
| 399 | Resource Management | Commercial Tool 1/PMD | 184 |
| 93 | Improper Neutralization of CRLF Sequences ('CRLF Injection') | FindBugs | 107 |
| 398 | 7PK - Code Quality | Findbugs | 98 |
| 117 | Log Forging | Commercial Tool 1 | 89 |
| 465 | Pointer Issues | Commercial Tool 1 | 83 |
| 22 | Path Traversal | Commercial Tool 1 | 80 |
| 79 | Cross-site Scripting (XSS) | Commercial Tool 1 | 73 |
| 119 | Improper Restriction of Operations within the Bounds of a Memory Buffer | Cppcheck | 66 |
| 456 | Member variable uninitialized in constructor | Cppcheck | 63 |
| 465 | Pointer Issues | Cppcheck | 62 |
| 79 | Cross-site Scripting (XSS) | FindBugs | 52 |

Referring now to TABLE 4, Table 4 shows for each static analysis tool, the number of software systems with false positive findings out of the total 21 software systems. For example, Commercial Tool 1 generated false positives in 16 out of 21 systems. It is important to mention that Commercial Tool 1 also generated the highest number of true vulnerabilities also, because the tool scans multiple languages together while the majority of the rest of the tools are specialized in one language only. The data we are presenting is not used to compare the tools but an attempt to identify false positive trends per tool. Since Commercial tool 1 generates the highest number of potential vulnerabilities in general, it is expected to produce a high number of false positives also; however, it does not mean that it performs worse than the rest of the tools in correctly identifying true vulnerabilities. In addition, the programming language the software system is written in, dictates which tools will run and generate results and it will not be fair to compare the tools since each tool scans a different part of the code that is very often written in different language.

TABLE 4

Number of software systems with generated FP vulnerabilities by each tool

| Static Analysis Tool Name | Number of Applicable Software Systems Scanned |
|---|---|
| Commercial Tool 1 | 16 |
| FindBugs | 9 |
| Cppcheck | 7 |
| PMD | 7 |
| PHP_CodeSniffer | 6 |
| FxCop | 3 |
| Pylint | 3 |
| Brakeman | 2 |
| CheckStyle | 2 |
| Gendarme | 2 |

Referring now to FIG. 9, FIG. 9 illustrates a chart providing a visual presentation of the percentage of the false positive vulnerabilities each tool generated. Some tools identified the same vulnerabilities and are displayed together.

Figure 10:
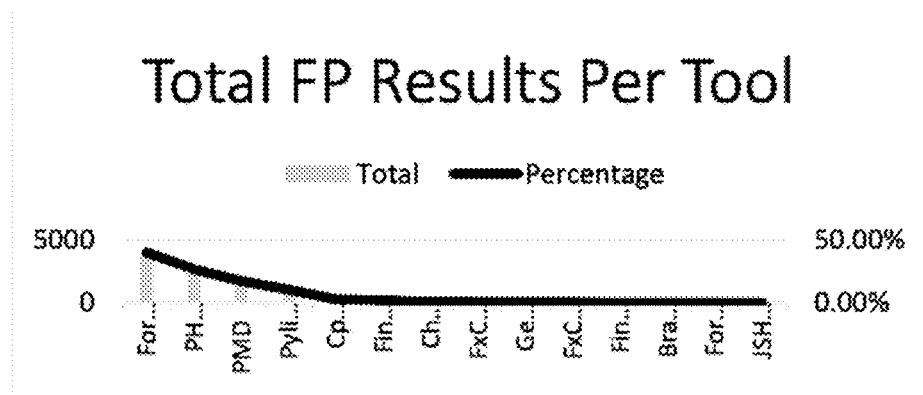
FIG. 10 is a graphical illustration showing total false positives results per tool, according to an embodiment.

Referring now to FIG. 10, The observations made from these results offer valuable insight on the type of false positives generated during static code analysis.

However, we need to make the following observations and assumptions regarding the potential vulnerabilities in the datasets we examined.

Since the typical finding produced by the tools average from 50,000 to 60,000 it is impossible for an independent software assurance team to go over each one of them within a reasonable time frame. Therefore, only a fraction of the total vulnerabilities produced by the tools were assessed. The analyst team that manually examined and labeled the ground truth must prioritize the vulnerabilities to examine, based on the severity status (critical, high, medium, low) of vulnerability. All critical and high severity vulnerabilities were manually evaluated by the team (due to actual organizational policy that requires such manual evaluation). Some false positives may have been missed since they were not deemed of high priority for assessment (the low severity findings that were missed usually represent performance and code quality issues, not actual vulnerabilities).

In addition, the actual percentage of the false positives cannot be accurately estimated without input from the system owners/developers. The developers are the ones that are capable to make the final determination of each false positive when they are given a possible vulnerability in their own code.

A tool like Commercial Tool 1 that generates a lot of vulnerabilities (both true and false positives) is expected to generate a higher number of false positives compared to other tools because the number of potential vulnerabilities identified by this tool is much higher than the one produced by the other tools.

Examples Using the SAPI Classification Algorithm

In this set of examples, the goal is to compare the SAPI classification algorithm against SGD, the best classifier as it was determined in the previous examples.

Specifically, the aim is to figure out whether these two classifiers provide similar results by running on the same dataset.

Dataset and Example Setup

For this part of the study we used a new dataset that is derived from static code analysis results generated using a production system code. The static code analysis results contained 1481 potential vulnerabilities. The production system is currently in use and an independent software assurance team manually reviewed the vulnerabilities to obtain the ground truth. The overall process of this example is shown in FIG. 10.

Figure 11:
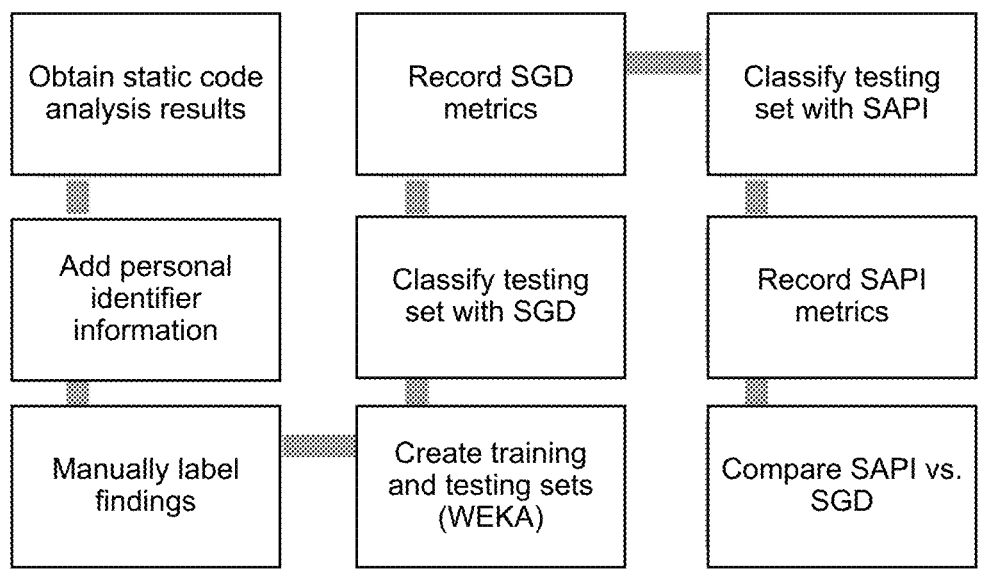
FIG. 11 is a graphical illustration showing a process of executing and comparing SGD and SAPI, according to an embodiment.

Referring now to FIG. 11, FIG. 11 shows a Process of executing and comparing SGD and SAPI.

A new and important dimension has been added to this example: we also want to compare the performance of different sizes of training and testing split of the dataset. We conducted this example in two phases: in the first phase we divided the dataset into a 70% training set and a 30% test set. In the second phase we tested with an approximate 10% training set and approximate 90% test set.

There is a very specific reasoning behind the decision to use a 10% training set. We would like the invention to be used and have an impact on actual day-to-day operations environment. Static analysis code results are usually in the tens or hundreds of thousands of potential vulnerabilities and manual examination of all of them is impractical.

We want to compare how close the results of the two phases of the examples would be. If they are close enough we can safely switch to the 10% training set and still maintain a high level of accuracy in identifying the actual vulnerabilities. This is an excellent solution that can be applied to a production environment, because it is not feasible to have a 70% labeled training set for each system for which we want to employ classification. Manually labeling just a small 10% of the dataset to use for training saves significant time and resources to the SwA team for the manual analysis of the vulnerabilities. The majority of the vulnerabilities in the dataset used for the examples were located in Java files.

In addition, we wanted to compare the Stochastic Gradient Descent (SGD) which was determined as the algorithm that provides the highest Accuracy, Precision, Recall, and F-Measure (as shown in the previous example) against the SAPI classification algorithm.

For the examples we ran the source code through a set of open source tools to identify software vulnerabilities. The training and testing datasets included the results of the following tools: Commercial Tool 1, PMD and FindBugs. The code base that was scanned is a software system currently in use. The dataset used for this code base contained 1481 vulnerabilities, which were manually verified. We checked every file that contains the code part where the vulnerability resides in order to obtain the developer and/or source information. We added the personal identifier information (e.g., author or source) on each vulnerability where applicable. For the vulnerabilities where the author information was missing, we added "No author" as author.

The static code analysis results had the following features per vulnerability:

ID, Severity, CWE, Rule, Description, Tool, Location, Path.

CWE refers to the Common Weakness Enumeration industry standards that list software weakness types [1]. Based on the feature selection work of the invention, we identified the following features as the most relevant and we added a Personal Identifier (PI), such as the Author (developer):

CWE, Path (without the filename), Subtype, Author.

Vulnerability Subtype is the feature that replaces and removes the noise from the Description feature. It is a unique characteristic of the vulnerability (e.g., function name), which we identified this as an important characteristic of a vulnerability [26]. The vulnerability subtype distinguishes the specific result from vulnerabilities that have the same CWE and file path and assists in identifying the vulnerability as true or false more accurately.

We used the above features in addition to the personal identifier, which adds an additional layer of distinction between similar vulnerabilities. The goal is to differentiate the vulnerabilities that are real threats and eliminate the false positives to the extent possible without compromising the true positive prediction.

Figure 12:
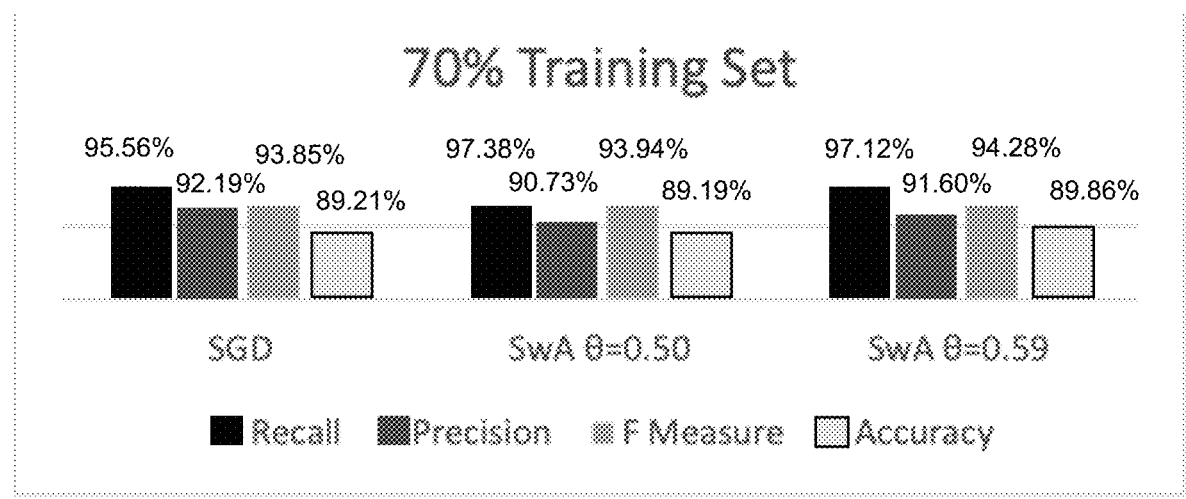
FIG. 12 is a graphical illustration showing Case I classier results with a 70% training set, according to an embodiment.

Referring now to FIG. 12, based on work experience and observations, one very significant factor that can predict whether a vulnerability is true is author or source, particularly if it is repeated elsewhere in the code. It is very common to see the same type of vulnerabilities in different parts of the code. If two vulnerabilities have the same subtype and author's name, then there is likelihood that the vulnerabilities are similar. Developers usually cut and paste code in different parts of the code base, or use the same programming techniques. Experience also is a significant factor on the programming practices. This observation led us to add the PI in the classification algorithm and compare the results with the so far highest performing SGD algorithm from the previous part of the invention.

Phase 1: Traditional (70% and 30%) Split of the Dataset

We used a 70% training set, 30% test set and random sampling using Waikato Environment for Knowledge Analysis (WEKA). Then, we used the SGD built-in WEKA classifier and recorded the metrics associated with the classification results (e.g., Accuracy, Recall, Precision, F-Measure). Finally, we used the same training set and test set with the SAPI classification algorithm. We recorded the metrics and compared the results of the two different classifiers, SGD, and SAPI. These series of examples are better associated with existing academic practice for binary classification analysis since the training set used is 70% and more accurately reflects the common academic practice with the training set being a lot larger than the test set. FIG. 11 displays the Precision, Recall, F-Measure, and Accuracy results obtained at the first case of this part of the study where the prediction was made using 70% of the scanning results as the training test and the remaining 30% as test. An observation here is that the SAPI classification algorithm with the two different thresholds performed better compared to SGD algorithm. In addition, we can see that if we increase the threshold of the SAPI classification algorithm, then more false positives are identified accurately. Please note that the examples with SAPI were conducted twice with two different values of threshold: First with θ=0.50 and secondly with θ=0.59. We observe that the algorithm performs better with a higher level of Recall, a higher level of F-Measure, and a higher level of Accuracy (for higher thresholds). Overall, in order to get higher rates on Precision with the SAPI classification algorithm, we can just raise the threshold and get an improvement.

In addition, we examined the actual numbers of true/false positive and true/false negatives generated by the two classifiers SAPI, and SGD. We then compared these numbers as shown in Table 10. We used two different thresholds for SAPI and compared the results with the SGD algorithm. We found out that the SAPI classification algorithm outperformed by far the SGD classifier. Specifically, SAPI produced a lower number of false negatives (about 10) compared to the ones of the SGD (17!) almost a (17−10)/17=41% decrease in identifying false negatives. From the cybersecurity perspective this is quite important since SAPI missed much fewer actual vulnerabilities compared to the SGD. At the same time, the number of true positives are high for SAPI (also for SGD).

We estimate that by increasing the threshold we will have an increase in specificity (more true negatives will be identified). The user has to decide on the tradeoff between specificity and sensitivity, depending on the situation. The algorithm offers the option to explore with different thresholds and prediction results.

TABLE 5

SAPI outperforms SGD in terms of TP, FP, FN

|  | Positive | Negative |
|---|---|---|
| SAPI θ = 0.50 |  |  |
| True | 372 | 24 |
| False | 38 | 10 |

TABLE 5-continued

SAPI outperforms SGD in terms of TP, FP, FN

|  | Positive | Negative |
|---|---|---|
| SAPI θ = 0.59 |  |  |
| True | 371 | 28 |
| False | 34 | 11 |
| SGD |  |  |
| True | 372 | 31 |
| False | 32 | 17 |

In this phase we used approximately 10% of the labeled static code analysis scan results as a training test and approximately 90% as the test set. We ran the SGD and the SAPI classification algorithms again and compared the results.

Referring now to FIG. 12, the stratified sampling technique was implemented for this phase of the examples.

As we can observe (see FIG. 12), the algorithm with the two different thresholds outperformed the SGD. The SAPI classification algorithm with a threshold θ=0.50 outperformed SGD in all metrics: Recall, Precision, F-Measure and Accuracy. The SAPI classification algorithm with θ=0.59 outperformed SAPI in Precision, F-Measure and Accuracy and offered similar results on Recall. An additional advantage of the SAPI classification algorithm compared to SGD is the flexibility the threshold offers when labeling the results as either true of false positive. Changing the value of the threshold allows the user to focus either on the true or false positives since increasing the threshold assists in identifying more true negatives and decreasing the threshold assists with identifying more true positives.

Referring now to TABLE 6, we found out that the SAPI classification algorithm outperforms by far the SGD classifier. Specifically, SAPI produces a lower number of false negatives (about 23) for SAPI with threshold θ=0.50 compared to the ones of the SGD (34) almost a (34−23)/34=32% decrease in identifying false negatives, while identifying a lot more true positives (1152) compared to SGD (1123).

TABLE 6

SAPI outperforms SGD in terms of TP, FP, FN

|  | Positive | Negative |
|---|---|---|
| SAPI θ = 0.50 |  |  |
| True | 1152 | 42 |
| False | 115 | 23 |
| SAPI θ = 0.59 |  |  |
| True | 1138 | 53 |
| False | 104 | 37 |
| SGD |  |  |
| True | 1123 | 57 |
| False | 118 | 34 |

Figure 13:
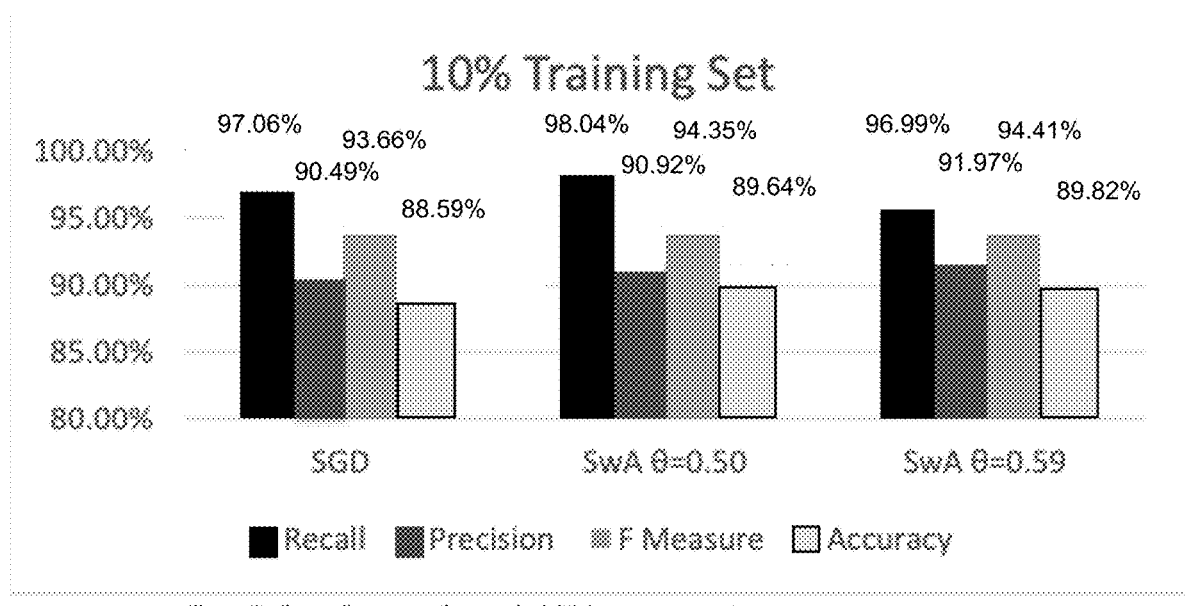
FIG. 13 is a graphical illustration showing Case I classifier results with a 10% training set, according to an embodiment.

Referring now to FIG. 13, we calculated the ROC curve (FIG. 13) for both types of vulnerabilities, the true positives and true negatives on the 10% dataset using the SAPI classification algorithm results. We want to see the level of the ROC curve based on this example. The closer the curve is on the left and top border, the better the algorithm performs. Based on the Phase 2 results on the 10% training set, the AUC is 0.805, an indication that the results are quite good and considering that we used only a smaller dataset for training, we can certainly say that the SAPI classification algorithm works extremely well.

Discussion

FIG. 12 shows the Accuracy, Recall and Precision obtained using 10% of the dataset as a training set and using the remaining set as test. SAPI classification algorithm is presented twice in the figure using two different thresholds θ. Any vulnerabilities above the threshold θ were labeled as true positive, while any vulnerabilities below the threshold were labeled as false positives. In the examples we calculate the results with two thresholds: θ=0.5 and θ=0.59. The 0.59 (59%) it was randomly chosen because it is a value above the 0.50 possibility that the result is true positive and we wanted to see whether raising the threshold would affect the prediction of the false and true positives. Since it is a user-defined threshold, users can determine the value that best fits the environment and the example at hand. For example, if the users would like to find as many false positives as possible, they would need to raise the threshold. If the users prefer to identify a higher percentage of true positive vulnerabilities, they would need to lower it.

The comparison of the results for the two different threshold values indicates that as we increase the threshold, we identify more true negative vulnerabilities, and we misclassify more true positive vulnerabilities.

Figure 14:
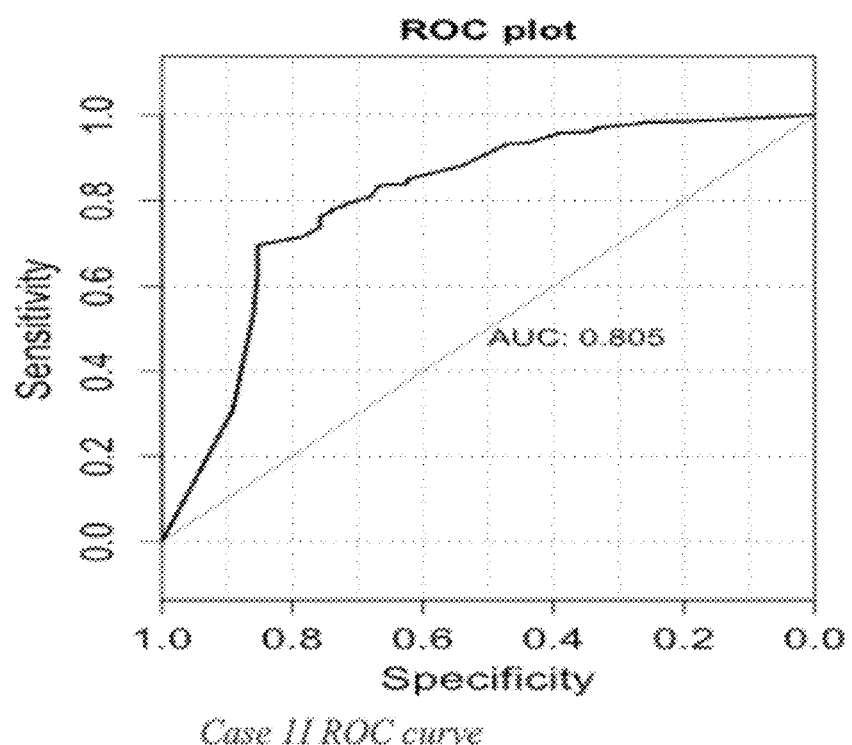
FIG. 14 is a graphical illustration showing Case 1I ROC curve, according to an embodiment.

Referring now to FIG. 14, FIG. 14 shows an ROC plot of Sensitivity vs. Specificity.

Figure 15:
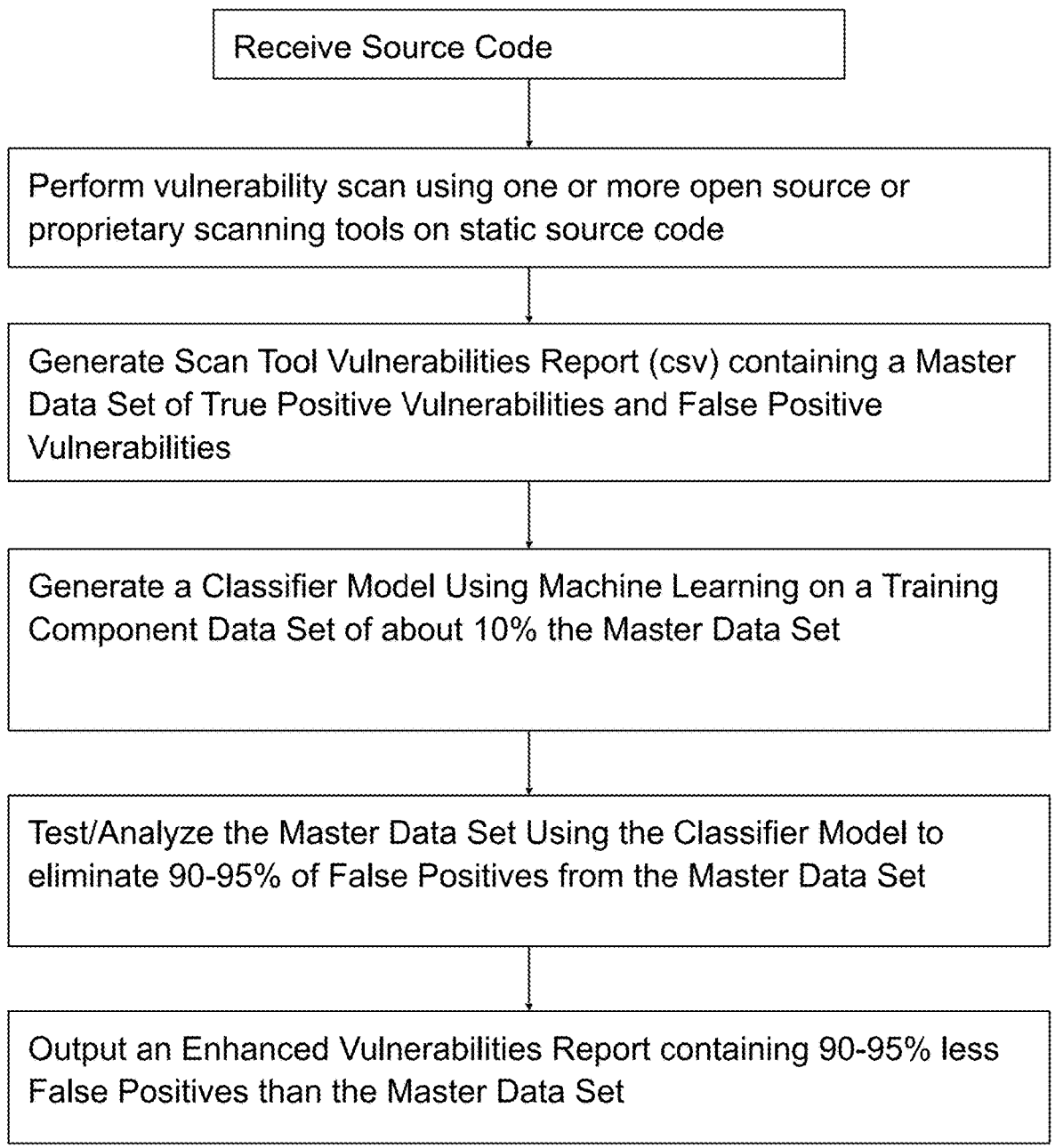
FIG. 15 is a graphical illustration showing a process for reducing false positives from a Master Data Set, according to an embodiment

Referring now to FIG. 15, FIG. 15 illustrates a process according to an embodiment that includes:

1. STEP 1—receive Source Code (e.g. from customer).
2. STEP 2—perform a vulnerability scan using one or more open source or proprietary scanning tools on the status source code.
3. STEP 3—generate Scan Tool Vulnerabilities Report (csv) containing a Master Data Set of True Positive Vulnerabilities and False Positive Vulnerabilities.
4. STEP 4—Generate a Classifier Model Using Machine Learning on a Training Component Data Set of about 10% the Master Data Set.
5. STEP 5—Test/Analyze the Master Data Set Using the Classifier Model to eliminate 90-95% of False Positives from the Master Data Set.
6. STEP 6—Output an Enhanced Vulnerabilities Report containing 90-95% less False Positives than the Master Data Set.
7. As can be seen, the main aspect of the invention pays in taking a csv report at STEP 3, and performing STEPS 4-6.

FIGS. 16-17 are discussed above.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 18:
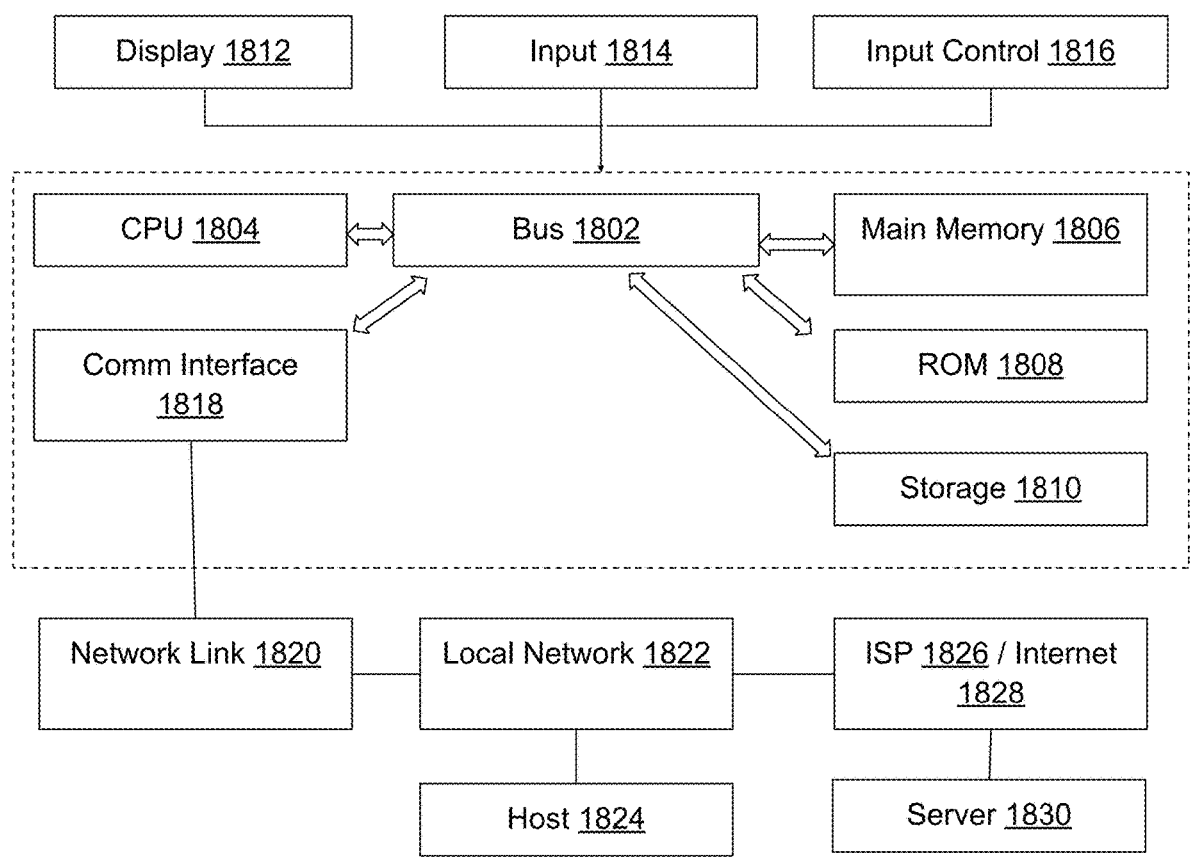
FIG. 18 is a graphical illustration of a hardware setup, e.g. for a Software-as-a-Service process.

For example, FIG. 18 is a block diagram that illustrates a computer system 1800 upon which an embodiment of the invention may be implemented. Computer system 1800 includes a bus 1802 or other communication mechanism for communicating information, and a hardware processor 1804 coupled with bus 1802 for processing information. Hardware processor 1804 may be, for example, a general purpose microprocessor.

Computer system 1800 also includes a main memory 1806, such as a random access memory (RAM) or other dynamic storage device, coupled to bus 1802 for storing information and instructions to be executed by processor 1804. Main memory 1806 also may be used for storing temporary variables or other intermediate information during execution of instructions to be executed by processor 1804. Such instructions, when stored in non-transitory storage media accessible to processor 1804, render computer system 1800 into a special-purpose machine that is customized to perform the operations specified in the instructions.

Computer system 1800 further includes a read only memory (ROM) 1808 or other static storage device coupled to bus 1802 for storing static information and instructions for processor 1804. A storage device 1810, such as a magnetic disk or optical disk, is provided and coupled to bus 1802 for storing information and instructions.

Computer system 1800 may be coupled via bus 1802 to a display 1812, such as a cathode ray tube (CRT), for displaying information to a computer user. An input device 1814, including alphanumeric and other keys, is coupled to bus 1802 for communicating information and command selections to processor 1804. Another type of user input device is cursor control 1816, such as a mouse, a trackball, or cursor direction keys for communicating direction information and command selections to processor 1804 and for controlling cursor movement on display 1812. This input device typically has two degrees of freedom in two axes, a first axis (e.g., x) and a second axis (e.g., y), that allows the device to specify positions in a plane.

Computer system 1800 may implement the techniques described herein using customized hard-wired logic, one or more ASICs or FPGAs, firmware and/or program logic which in combination with the computer system causes or programs computer system 1800 to be a special-purpose machine. According to one embodiment, the techniques herein are performed by computer system 1800 in response to processor 1804 executing one or more sequences of one or more instructions contained in main memory 1806. Such instructions may be read into main memory 1806 from another storage medium, such as storage device 1810. Execution of the sequences of instructions contained in main memory 1806 causes processor 1804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1810. Volatile media includes dynamic memory, such as main memory 1806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1802. Transmission media can also take the form of acoustic or light waves, such as those generated during radio-wave and infra-red data communications.

Various forms of media may be involved in carrying one or more sequences of one or more instructions to processor 1804 for execution. For example, the instructions may initially be carried on a magnetic disk or solid state drive of a remote computer. The remote computer can load the instructions into its dynamic memory and send the instructions over a telephone line using a modem. A modem local to computer system 1800 can receive the data on the telephone line and use an infra-red transmitter to convert the data to an infra-red signal. An infra-red detector can receive the data carried in the infra-red signal and appropriate circuitry can place the data on bus 1802. Bus 1802 carries the data to main memory 1806, from which processor 1804 retrieves and executes the instructions. The instructions received by main memory 1806 may optionally be stored on storage device 1810 either before or after execution by processor 1804.

Computer system 1800 also includes a communication interface 1818 coupled to bus 1802. Communication interface 1818 provides a two-way data communication coupling to a network link 1820 that is connected to a local network 1822. For example, communication interface 1818 may be an integrated services digital network (ISDN) card, cable modem, satellite modem, or a modem to provide a data communication connection to a corresponding type of telephone line. As another example, communication interface 1818 may be a local area network (LAN) card to provide a data communication connection to a compatible LAN. Wireless links may also be implemented. In any such implementation, communication interface 1818 sends and receives electrical, electromagnetic or optical signals that carry digital data streams representing various types of information.

Network link 1820 typically provides data communication through one or more networks to other data devices. For example, network link 1820 may provide a connection through local network 1822 to a host computer 1824 or to data equipment operated by an Internet Service Provider (ISP) 1826. ISP 1826 in turn provides data communication services through the world wide packet data communication network now commonly referred to as the "Internet" 1828. Local network 1822 and Internet 1828 both use electrical, electromagnetic or optical signals that carry digital data streams. The signals through the various networks and the signals on network link 1820 and through communication interface 1818, which carry the digital data to and from computer system 1800, are example forms of transmission media.

Computer system 1800 can send messages and receive data, including program code, through the network(s), network link 1820 and communication interface 1818. In the Internet example, a server 1830 might transmit a requested code for an application program through Internet 1828, ISP 1826, local network 1822 and communication interface 1818.

The received code may be executed by processor 1804 as it is received, and/or stored in storage device 1810, or other non-volatile storage for later execution.

The terminology used herein is for the purpose of describing particular embodiments only and is not intended to limit the full scope of the claims. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

As used herein, the singular forms "a", "an" and "the" are intended to include the plural forms as well, unless the context clearly indicates otherwise. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," etc.). Similarly, the terms "comprises" and/or "comprising," when used in this specification, specify the presence of stated features, integers (or fractions thereof), steps, operations, elements, and/or components, but do not preclude the presence or addition of one or more other features, integers (or fractions thereof), steps, operations, elements, components, and/or groups thereof. As used in this document, the term "comprising" means "including, but not limited to."

As used herein the term "and/or" includes any and all combinations of one or more of the associated listed items. It should be understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All ranges disclosed herein also encompass any and all possible subranges and combinations of subranges thereof unless expressly stated otherwise. Any listed range should be recognized as sufficiently describing and enabling the same range being broken down into at least equal subparts unless expressly stated otherwise. As will be understood by one skilled in the art, a range includes each individual member.

Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Where schematics and/or embodiments described above indicate certain components arranged in certain orientations or positions, the arrangement of components may be modified. While the embodiments have been particularly shown and described, it will be understood that various changes in form and details may be made. Any portion of the apparatus and/or methods described herein may be combined in any combination, except mutually exclusive combinations.

The embodiments described herein can include various combinations and/or sub-combinations of the functions, components, and/or features of the different embodiments described. Various of the above-disclosed and other features and functions, or alternatives thereof, may be combined into many other different systems or applications. Various presently unforeseen or unanticipated alternatives, modifications, variations, or improvements therein may be subsequently made by those skilled in the art, each of which is also intended to be encompassed by the disclosed embodiments.

The invention claimed is:

1. A computer-implemented method for labeling true and false vulnerabilities in software code after static code analysis, comprising:
    performing a vulnerability scan of static code using one or more open source or proprietary scan tools, to obtain a scan tool vulnerabilities report containing a master data set of labeled vulnerabilities comprising true positive vulnerabilities and false positive vulnerabilities,
    the static code selected from source code, binaries, and bytecode, and
    aggregating the scan tool vulnerabilities report results into a comma separated values (CSV) file of potential vulnerabilities,
    each labeled vulnerability selected from the group consisting of author/personal identifier (ID), severity, common weakness and enumerations (CWE), Subtype, Rule, description, Tool, vulnerability location, and Path;
    Creating a training data subset of the master data set from the scan tool vulnerabilities report using machine learning software Waikato Environment for Knowledge Analysis (WEKA) and applying a stratified sampling technique to obtain the training data subset, wherein the training data subset is a 10%-30% data subset of the master data set;
    Generate a software assurance personal identifier/vulnerability identification system (SAPI/VISYS) classifier algorithm from the labeled vulnerabilities of the 10%-30% data subset, the SAPI/VISYS classifier algorithm having a formula, $$SAPI(Fi)=((R(C)+R(P)+R(S)+R(A)+R(CA)+R(CPA)+R(CAS)/k+R(CPA)+R(CAS))/a,$$

where C is the CWE vulnerability, S is the CWE subtype from part of the description of a function or parameter name, A is the author, P is the path, CA is the combination of author and CWE, CP is the combination of path and CWE, CPA is the combination of CWE, path and author, CAS is the combination of CWE, author and subtype, k is the count of the types of vulnerabilities (CWE, path, subtype, author), "a" is the count of the number of times the combination of CPA and CAS appears in the 10%-30% data subset;
    where the algorithm calculates for each vulnerability a probability of being a true positive vulnerability, and uses a 20.3%-50% observed false positive (OFP) threshold to separate a true positive vulnerability from a false positive vulnerability;
    Performing a SAPI/VISYS classifier algorithm scan of the master data set to obtain a SAPI/VISYS classifier algorithm scan tool vulnerabilities report containing a revised master data set of re-labeled vulnerabilities comprising true positive vulnerabilities and 90-95% less false positive vulnerabilities, compared to the original master data set;
    wherein the method is performed by one or more computing devices.

2. A system for labeling true and false vulnerabilities in software code after static code analysis comprising:
    one or more processors;
    one or more storage media storing instructions which, when executed by the one or more processors are configured to provide
    one or more open source or proprietary scan tools configured to perform a vulnerability scan of static code to obtain a scan tool vulnerabilities report containing a master data set of labeled vulnerabilities comprising true positive vulnerabilities and false positive vulnerabilities, the static code selected from source code, binaries, and bytecode, and
    a comma separated values (CSV) file of potential vulnerabilities aggregated from the scan tool vulnerabilities report results,
    wherein each labeled vulnerability selected from the group consisting of author/personal identifier (ID), severity, common weakness and enumerations (CWE), Subtype, Rule, description, Tool, vulnerability location, and Path;
    a training data subset of the master data set created from the scan tool vulnerabilities report using machine learning software Waikato Environment for Knowledge Analysis (WEKA) and a stratified sampling technique to obtain the training data subset, wherein the training data subset is a 10%-30% data subset of the master data set;
    a software assurance personal identifier/vulnerability identification system (SAPI/VISYS) classifier algorithm generated from the labeled vulnerabilities of the 10%-30% data subset, the SAPI/VISYS classifier algorithm having a formula, $$SAPI(Fi)=((R(C)+R(P)+R(S)+R(A)+R(CA)+R(CPA)+R(CAS)/k+R(CPA)+R(CAS))/a,$$

where C is the CWE vulnerability, S is the CWE subtype from part of the description of a function or parameter name, A is the author, P is the path, CA is the combination of author and CWE, CP is the combination of path and CWE, CPA is the combination of CWE, path and author, CAS is the combination of CWE, author and subtype, k is the count of the types of vulnerabilities (CWE, path, subtype, author), "a" is the count of the number of times the combination of CPA and CAS appears in the 10%-30% data subset;
    where the algorithm calculates for each vulnerability a probability of being a true positive vulnerability, and uses a 20.3%-50% observed false positive (OFP) threshold to separate a true positive vulnerability from a false positive vulnerability;

the SAPI/VISYS classifier algorithm configured to scan the master data set to obtain a SAPI/VISYS classifier algorithm scan tool vulnerabilities report containing a revised master data set of re-labeled vulnerabilities comprising true positive vulnerabilities and 90-95% less false positive vulnerabilities, compared to the original master data set.

3. The method of claim 1, where the author/personal identifier (ID) vulnerability is "no author" and is replaced with a file properties vulnerability in the SAPI/VISYS formula, where C is the CWE vulnerability, S is the CWE subtype, P is the location/path, FN is the filename where the vulnerability resides, FL is the length of the file where the vulnerability resides, LW is the last write information (date) of the file where the vulnerability resides, CP is the combination of CWE and Path (location), CL is the combination of CWE and File length, CPL is the combination of CWE, Path and file length, CA is the combination of author and CWE and A (filename, file length, last write), CPA is the combination of CWE, Path and A (filename, file length, last write), CAS is the combination of CWE, Subtype and A (filename, file length, last write), CFIS is the combination of CWE, File length and sub type, and wherein an extra feature called "bias" is added which is the observed true positive (OTP) ratio of all the findings of the training dataset, and wherein C OTP is calculated as R(C), and wherein all the above ratios are averaged together.

4. The method of claim 1, where the vulnerabilities are in the SAPI/VISYS formula are weighted.

5. The method of claim 1, wherein the accuracy, precision, and recall of the SAPI/VISYS formula has a 41% decrease in false positives compared to stochastic gradient descent (SGD).

* * * * *